United States Patent
Kappeler et al.

(10) Patent No.: US 10,878,551 B2
(45) Date of Patent: Dec. 29, 2020

(54) VISUAL INSPECTION SYSTEM FOR AUTOMATED DETECTION OF PARTICULATE MATTER IN FLEXIBLE MEDICAL CONTAINERS

(71) Applicants: Baxter International Inc., Deerfield, IL (US); Baxter Healthcare SA, Opfikon (CH); Northwestern University, Evanston, IL (US)

(72) Inventors: Armin Kappeler, Evanston, IL (US); Aggelos K. Katsaggelos, Chicago, IL (US); Georgios Andrea Bertos, Chicago, IL (US); Kirk Andrew Ashline, Third Lake, IL (US); Neal Anthony Zupec, Spring Grove, IL (US)

(73) Assignees: Baxter International Inc., Deerfield, IL (US); Baxter Healthcare SA, Opfikon (CH); Northwestern University, Evanston, IL (US)

( * ) Notice: Subject to any disclaimer, the term of this patent is extended or adjusted under 35 U.S.C. 154(b) by 1373 days.

(21) Appl. No.: 14/606,582

(22) Filed: Jan. 27, 2015

(65) Prior Publication Data

US 2015/0213616 A1 Jul. 30, 2015

Related U.S. Application Data

(60) Provisional application No. 61/932,065, filed on Jan. 27, 2014.

(51) Int. Cl.
*G06T 7/00* (2017.01)
*G06T 15/00* (2011.01)
(Continued)

(52) U.S. Cl.
CPC ....... *G06T 7/0004* (2013.01); *G01N 15/1429* (2013.01); *G01N 15/1434* (2013.01);
(Continued)

(58) Field of Classification Search
CPC .... H04N 1/4072; H04N 13/02; G06T 7/0004; A01N 1/02; G01N 21/8851; G01N 21/9027; G02B 21/361; G01S 13/9303
(Continued)

(56) References Cited

U.S. PATENT DOCUMENTS 7,560,720 B2 * 7/2009 Voigt ................. G01N 21/9027
209/524
2005/0221269 A1 * 10/2005 Taylor ...................... A01N 1/02
435/1.1
(Continued)

*Primary Examiner* — Patricia I Young
(74) *Attorney, Agent, or Firm* — K&L Gates LLP

(57) ABSTRACT

Systems and methods for automated detection and classification of objects in a fluid of a receptacle such as, for example, a soft-sided receptacle such as a flexible container. The automated detection may include initiating movement of the receptacle to move objects in the fluid contained by the receptacle. Sequential frames of image data may be recorded and processed to identify moving objects in the image data. In turn, at least one motion parameter of the objects may be determined and utilized to classify the object into at least one of a predetermined plurality of object classes. For example, the object classes may at least include a predetermined class corresponding to bubbles and a predetermined class corresponding to particles.

38 Claims, 12 Drawing Sheets

(51) Int. Cl.
*G06T 7/215* (2017.01)
*G01N 15/14* (2006.01)
*G01N 15/10* (2006.01)
*G01N 35/00* (2006.01)

(52) U.S. Cl.
CPC ......... *G01N 15/1463* (2013.01); *G06T 7/215* (2017.01); *G01N 2015/1075* (2013.01); *G01N 2015/1488* (2013.01); *G01N 2015/1497* (2013.01); *G01N 2035/009* (2013.01)

(58) Field of Classification Search
USPC .......................................................... 348/92
See application file for complete search history.

(56) References Cited

U.S. PATENT DOCUMENTS

| | | | |
|---|---|---|---|
| 2008/0001104 A1* | 1/2008 | Voigt | G01N 21/8851 250/559.46 |
| 2012/0044342 A1* | 2/2012 | Hing | G02B 21/361 348/79 |
| 2012/0274816 A1* | 11/2012 | Kim | H04N 1/4072 348/242 |
| 2014/0002617 A1* | 1/2014 | Zhang | H04N 13/0242 348/48 |
| 2015/0160338 A1* | 6/2015 | Bageshwar | G01S 13/9303 342/29 |

* cited by examiner

VISUAL INSPECTION SYSTEM FOR AUTOMATED DETECTION OF PARTICULATE MATTER IN FLEXIBLE MEDICAL CONTAINERS

CROSS-REFERENCE TO RELATED APPLICATION

This application claims priority from U.S. Provisional Application No. 61/932,065 filed on Jan. 27, 2014, entitled "VISUAL INSPECTION SYSTEM FOR AUTOMATED DETECTION OF PARTICULATE MATTER IN FLEXIBLE MEDICAL CONTAINERS," the contents of which are incorporated by reference herein as if set forth in full.

BACKGROUND

Solutions for medical purposes are manufactured in a wide variety of container configurations that are matched in both material composition and physical designs to that of the therapeutic requirements and properties of the contained product. In general, therapeutic applications utilize appropriate routes of entry to infuse these solution products into human patients for treatment purposes. As such, regulatory agencies may dictate good manufacturing practices that specify the critical attributes of these solution products including, for example, identity, strength, quality, purity and potency, for which manufacturers must not only comply with but also demonstrate suitable methods in obtaining supportive information related to each of the criteria. The criteria (e.g., limits) and methodologies to meet the stated requirements are further defined in global compendia that are periodically revised and updated as new technologies emerge and manufacturing process capabilities improve.

The presence of particulate matter (i.e., in relation to the purity criteria) in these types of solution products is defined by limit criteria and thus makes it incumbent upon the manufacturer to control and monitor processes to increase compliance with the purity criteria. One historic method still currently practiced in industry is manual inspection of finished product for the presence of visible particulate matter which provides for the ability to remove the affected unit from production. Automated detection methods have been proposed to assist these processes. However, such automated detection methods have been designed for specific container types such as glass vials, glass syringes, and glass cartridges. This specificity in design results in such automated detection methods and technology not being amenable to use with flexible containers. Rather, the container formats for which automated inspection has been proposed are generally clear and allow for unimpeded visualization of a relatively small area of interrogation. Automated inspection machines employ spin and brake techniques to suspended particulate matter for detectability purposes. These automated systems provide the benefit of reproducibility and speed, however, false detection due to air bubbles or other artifact (e.g., inherent container features) are of concern. As all inspection processes are probabilistic in nature to some extent, the concerns for these automated methods are weighted against the manual inspection process and are generally accepted as lower risk in consideration of the factors that influence variability in the latter process, including fatigue and inspector technique and acuity to name a few. Therefore, the need exists for development related to automated visual inspection systems that accommodate use with flexible containers.

SUMMARY

In view of the foregoing, the present disclosure relates to embodiments of automated detection and classification of objects in a fluid contained by a receptacle. For example, the receptacle may be a soft-sided, flexible container. In this regard, a machine vision system may be provided for moving and/or imaging the receptacle upon initiation of object motion within the fluid contained by the receptacle. In turn, objects identified from sequential frames of image data of the receptacle may be associated with a motion track and have at least one motion parameter calculated for the object relating to the motion of the object through the fluid contained by the receptacle. Furthermore, the at least one motion parameter for an object may be used to classify the object into one of a predetermined plurality of object classes. In this regard, the classification may include use of a classifier module employing a classification model. The predetermined plurality of object classes may at least include a class corresponding to particles and a class corresponding to bubbles. Thus, classification of an object into the predetermined plurality of object classes may allow for the machine vision system to differentiate between bubbles and particles in the fluid contained by the receptacle.

A first aspect includes a method for automated detection and classification of objects in a receptacle containing a fluid utilizing a machine vision system. The method includes detecting, using a processor of the machine vision system, a first object in the fluid contained by the receptacle that appears in a plurality of sequential frames of digital image data of the receptacle. The method further includes determining, using a processor of the machine vision system, at least one motion parameter corresponding to movement of the first object through the fluid in the plurality of sequential frames. Furthermore, the method includes classifying, using a processor of the machine vision system, the first object into one of a predetermined plurality of object classes at least partially based on the at least one motion parameter of the first object.

A number of feature refinements and additional features are applicable to the first aspect. These feature refinements and additional features may be used individually or in any combination. As such, each of the following features that will be discussed may be, but are not required to be, used with any other feature or combination of features of the first aspect.

For instance, the method may further include moving the receptacle to initiate movement of the first object through the fluid in the receptacle. Additionally, the method may include capturing the plurality of sequential frames of digital image data of the receptacle with a camera of the machine vision system after the moving step with the receptacle stationary relative to the camera. In this regard, the moving step may include displacing the receptacle at least with respect to an axis. For instance, the axis may be orthogonally disposed relative to a field of view of the camera and the force of gravity. As such, upon movement of the receptacle about the axis, particle motion may be initiated by way of gravity acting on the particles and fluid in the receptacle.

In an embodiment, the detecting step may include observing pixels in at least a portion of the plurality of sequential frames of digital image data. In turn, the detecting step may include generating a background image corresponding to the receptacle based on the observing step. Furthermore, the method may include subtracting the background image from each of the plurality of sequential frames of digital image data to generate a foreground image indicative of the first object. Accordingly, moving objects may be filtered from the image data to generate the background image (e.g., by applying a median pixel intensity filter or the like).

In an approach, the method may include establishing a relative weighting for a first pixel of the foreground image relative to at least one other pixel value of the foreground image based on corresponding relative pixel intensities for the background image. Thus, objects that appear at or near non-transparent areas of the receptacle (e.g., areas corresponding to imprinted information on the receptacle) may be weighted by a weighting factor to account for difficulties in detecting the particles in the non-transparent areas of the receptacle. In an embodiment, the relative weighting (e.g., the relative magnitude of the weighting factor) may be inversely proportional to the relative intensity of the corresponding pixel for the background image.

In an embodiment, the method may include associating the first object with a first motion track. The method may also include calculating the at least one motion parameter for the first object at least partially based on the first motion track to which the first object is associated. In an application, the first motion track may be determined using observations of a location of the first object (i.e., an object observation) in the fluid of the receptacle in respective previous ones of the plurality of sequential frames of digital image data of the receptacle. In turn, the method may include establishing, at least partially based on the first motion track, a predicted area comprising a subset of pixels of a frame of the plurality of sequential frames of digital image data within which the first object is expected to be located in the frame.

In this regard, it may be appreciated that a plurality of objects may be located in the predicted area. In this case, the associating step may further include performing a statistical analysis for each of the plurality of objects relative to the first motion track to determine which of the plurality of objects corresponds to the first object. In various embodiments, the statistical analysis may include at least one of a global nearest neighbor (GNN) approach, a joint probabilistic data association (JPDA) approach, and multiple hypothesis tracking (MHT) approach.

In an application, the method may include detecting, using a processor of the machine vision system, at least a second object in the fluid contained by the receptacle that appears in a plurality of sequential frames of digital image data of the receptacle. In turn, the method may also include associating the second object with a second motion track and calculating at least one motion parameter corresponding to movement of the second object through the fluid in the plurality of sequential frames at least partially based on the second motion track to which the second object is associated. The method may further include classifying, using a processor of the machine vision system, the second object into one of a predetermined plurality of object classes at least partially based on the at least one motion parameter of the second object. That is, the method may be used to detect a plurality of objects, determine motion parameters for each object, and classify each object.

As may be appreciated, upon detection of an object that is not associated with a track (e.g., upon the first appearance of an object or in the first observation), a track may be generated that corresponds to the object. In this regard, the method may include establishing the first motion track in response to the detecting step. In an embodiment, the first motion track may be established only if an intensity value of one or more pixels corresponding to the first object is greater than a minimum new track threshold value.

In an embodiment, the classifying step may include executing a classification model using the processor of the machine learning system at least partially based on one or more features at least including the at least one motion parameter. The classification model may be generated using training data corresponding to one or more observed features of training objects to establish the predetermined plurality of object classes. For example, the one or more features may include a plurality of features that are selected from the group consisting of a motion parameter, a morphological characteristic, a radiometric characteristic, or a combination thereof. The motion parameter may include at least one of a velocity, a direction of travel, or an acceleration of the first object.

In an application, a first predetermined object class corresponds to particles and a second predetermined object class corresponds to bubbles. However, more than two classes may also be provided. As such, the method may include first classifying the first object into a subset group of the predetermined plurality of object classes and second classifying the first object into one of the subset group of the predetermined plurality of object classes. The subset group of the predetermined plurality of object classes may include a first predetermined object class corresponds to particles and a second predetermined object class corresponds to bubbles of a predetermined size.

In this regard, the method may be utilized in the production of receptacles for containing a fluid (e.g., flexible containers). In this regard, the method may be utilized in the production of the receptacle for quality control. As such, the method may also include generating an indication that the receptacle is defective upon classification of the first object into an object class corresponding to particles exceeding a predetermined size. The indication may be a human perceivable indication. Accordingly, the method may include discarding the receptacle in response to the indication.

When the method is used for inspection of receptacles such as flexible containers or receptacles, it may be necessary to detect relatively small particles. As such, in an embodiment each pixel in the plurality of sequential frames of digital image data corresponds to a resolution of not less than about 100 microns. In another embodiment, each pixel in the plurality of sequential frames of digital image data corresponds to a resolution of not less than about 60 microns. As such, particles a small as about 100 microns may be detected when using the method. However, it may be appreciated that by employing higher resolution cameras, modifying the size of the image field (e.g., modifying the magnification or optics of the camera or adjusting the camera position relative to the receptacle, etc.), modifying the backlighting, and/or use of polarization or other appropriate optical filters, the size of each pixel may be reduced, further reducing the size of particle that may be detected. For example, particles as small as 75 microns, 60 microns, or even 50 microns may be detected. As may be appreciated, when referring to a detected particle size, the dimension may correspond to a cross dimension of a particle (e.g., a width, a length, or a diameter of the particle).

A second aspect includes a machine vision system for automated detection and classification of objects in a receptacle containing a fluid. The system includes a receptacle support member operable to supportably engage a receptacle containing a fluid in a receptacle support region and a camera. The camera has an imaging field encompassing the receptacle support region and is operable to output a plurality of sequential frames of digital image data of the imaging field including the receptacle support region. The system also includes an image processing module in operative communication with the camera for receiving the plurality of sequential frames of digital image data. The imaging processing module includes a detection module to detect a first object in the fluid of the receptacle that appears in the plurality of sequential frames of digital image data of the receptacle. The image processing module also includes a motion analysis module to determine at least one motion parameter corresponding to movement of the first object through the fluid in the plurality of sequential frames of digital image data. Further still, the image processing module includes a classification module to classify the first object into one of a predetermined plurality of object classes at least partially based on the at least one motion parameter of the first object.

A number of feature refinements and additional features are applicable to the second aspect. These feature refinements and additional features may be used individually or in any combination. As such, each of the following features that will be discussed may be, but are not required to be, used with any other feature or combination of features of the second aspect.

For example, in an embodiment the receptacle support member may be moveable to initiate movement of the object in the fluid of the receptacle. The receptacle support member may be moveable at least with respect to an axis orthogonally disposed relative to the force of gravity. Accordingly and as described above, movement of the receptacle support member may initiate object movement. The receptacle support member is moveable at least with respect to an axis orthogonally disposed to the direction of the imaging field of the camera.

In an embodiment the receptacle support member may be transparent between the receptacle support region and the camera. Accordingly, the receptacle support region may be disposed between a light emitter and the camera. The system may further include a receptacle containing a fluid supportably engaged by the receptacle support member. The receptacle may be a flexible container such as a soft-sided flexible container or the like. Accordingly, the flexible bag may be at least partially transparent. The receptacle support member may include opposing transparent sidewall members supportably engaged with the receptacle at least in the receptacle support region.

DETAILED DESCRIPTION

Figure 1:
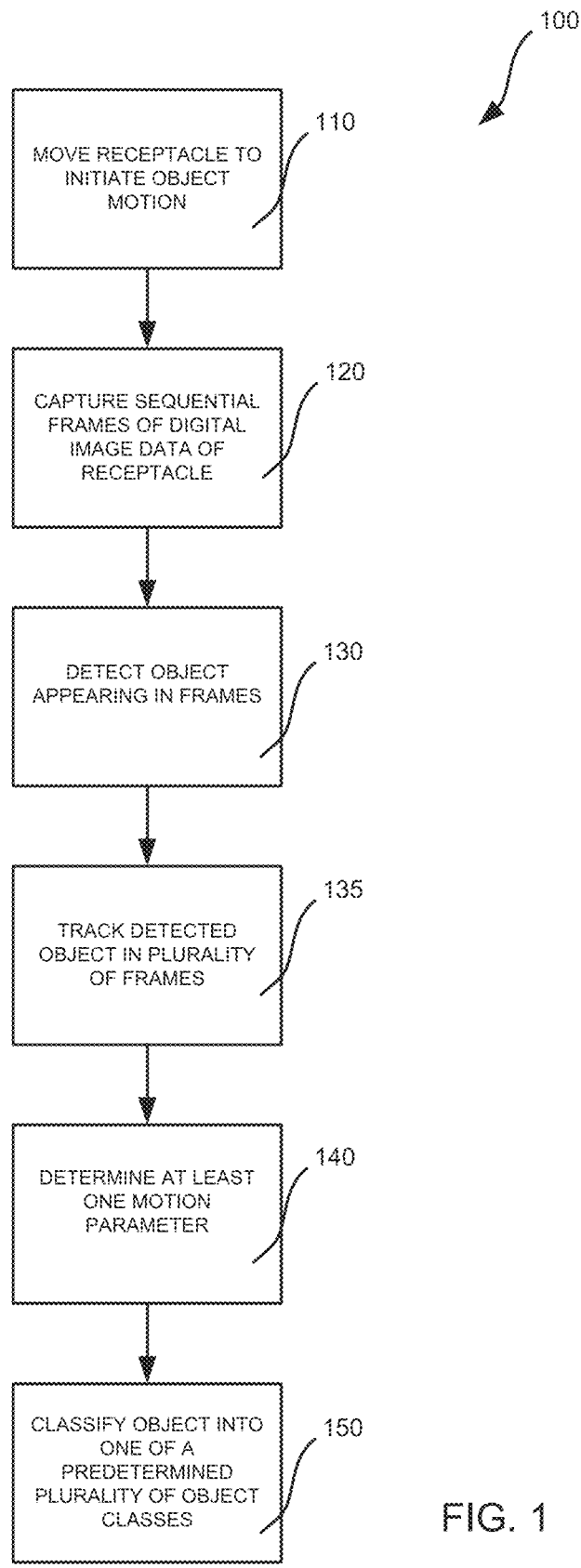
FIG. 1 is a flow chart depicting an embodiment of a process for automated object detection and classification in a receptacle containing fluid.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims.

With reference to FIG. 1, a flowchart depicting an embodiment of a process 100 for automated detection and classification of objects in a medical receptacle containing a fluid is shown. In an embodiment, the medical receptacle may comprise an at least partially transparent soft-sided flexible container. The flexible container may contain a fluid that is to be infused into a patient (e.g., utilizing appropriate routes of infusion). As such, particulate matter contained in the fluid within the bag may pose risks related to use of the flexible container in an infusion into a patient. Accordingly, such particles may be detected such that a flexible container containing such particles may be removed from production and/or properly disposed.

The process 100 may include moving 110 the receptacle. In this regard, the fluid contained within the receptacle may be moved, thus also initiating movement of any objects in the fluid. The process 100 may further include capturing 120 sequential frames of digital image data of the receptacle. The capturing 120 may be initiated once the moving 110 is complete. That is, the receptacle may be stationary (e.g., at least relative to a camera used to capture the image data) when the capturing 120 begins. However, while the receptacle may be stationary relative to the camera, any objects disposed within the receptacle may continue to move after the receptacle is stationary. Thus, the movement of such objects may be detected as the position of the objects change in the sequential frames of image data.

Accordingly, the process 100 may also include detecting 130 objects that appear in the sequential frames of digital image data acquired during the capturing 120. As will be described in greater detail below, the detecting 130 may include application of digital image processing techniques to identify objects from the sequential frames of digital image data. Such digital image processing may include, for example, background subtraction, binary image transformation, compensation for non-transparent portions of the receptacle, morphological operations, labeling, or other appropriate image analysis techniques known in the art. The process 100 may include the tracking 135 of the detected objects in a plurality of sequential frames. The tracking 135 may include generation of motion tracks to which the determined objects may be associated. Furthermore, the process 100 may include determining 140 at least one motion parameter associated with objects from the detecting 130. By way of example, the determining 140 may include analysis of a motion track to which an object is associated to determine at least one motion parameter for an object.

In turn, the process 100 may include classifying 150 an object that is detected in the fluid of the receptacle into one of a predetermined plurality of object classes 150. As such, the classifying 150 may be at least partially based on the at least one motion parameter determined for the object. In an embodiment, the predetermined plurality of object classes 150 may include at least one object class corresponding to bubbles and at least one object class corresponding to particles. The classifying 150 may differentiate between bubbles detected in the receptacle and particles within the receptacle. For instance, bubbles may be formed during the moving 110. In this regard, the bubbles may be detected along with any particles that may be present in the receptacle. As the bubbles may be insignificant (e.g., not pose a threat related to the use of the receptacle in infusion of the contained product into a human), false positive detection of bubbles may be detrimental to efficient detection of particles of significance (e.g., objects that affect the quality of the receptacle by, for example, having the potential to adversely affect an infusion of the product contained by the receptacle). By classifying 150 detected objects into one of a predetermined plurality of object classes, the insignificant objects (e.g., bubbles) may be disregarded while significant objects (e.g., particles) may be used to take action with respect to a receptacle (e.g., subject the receptacle to additional manual inspection or discard the receptacle).

The process 100 may provide advantages over known automated inspection systems. For example, as discussed above, proposed automated inspection systems require precise control over the movement of the receptacle to prevent bubble formation, which in such systems may lead to false positive detection of particles. However, because bubbles may be differentiated from particles in the process 100, such precise motion control may not be required. This may be particularly advantageous with respect to flexible containers because such soft-sided receptacles may be difficult to precisely move and/or be susceptible to bubble creation.

Figure 2:
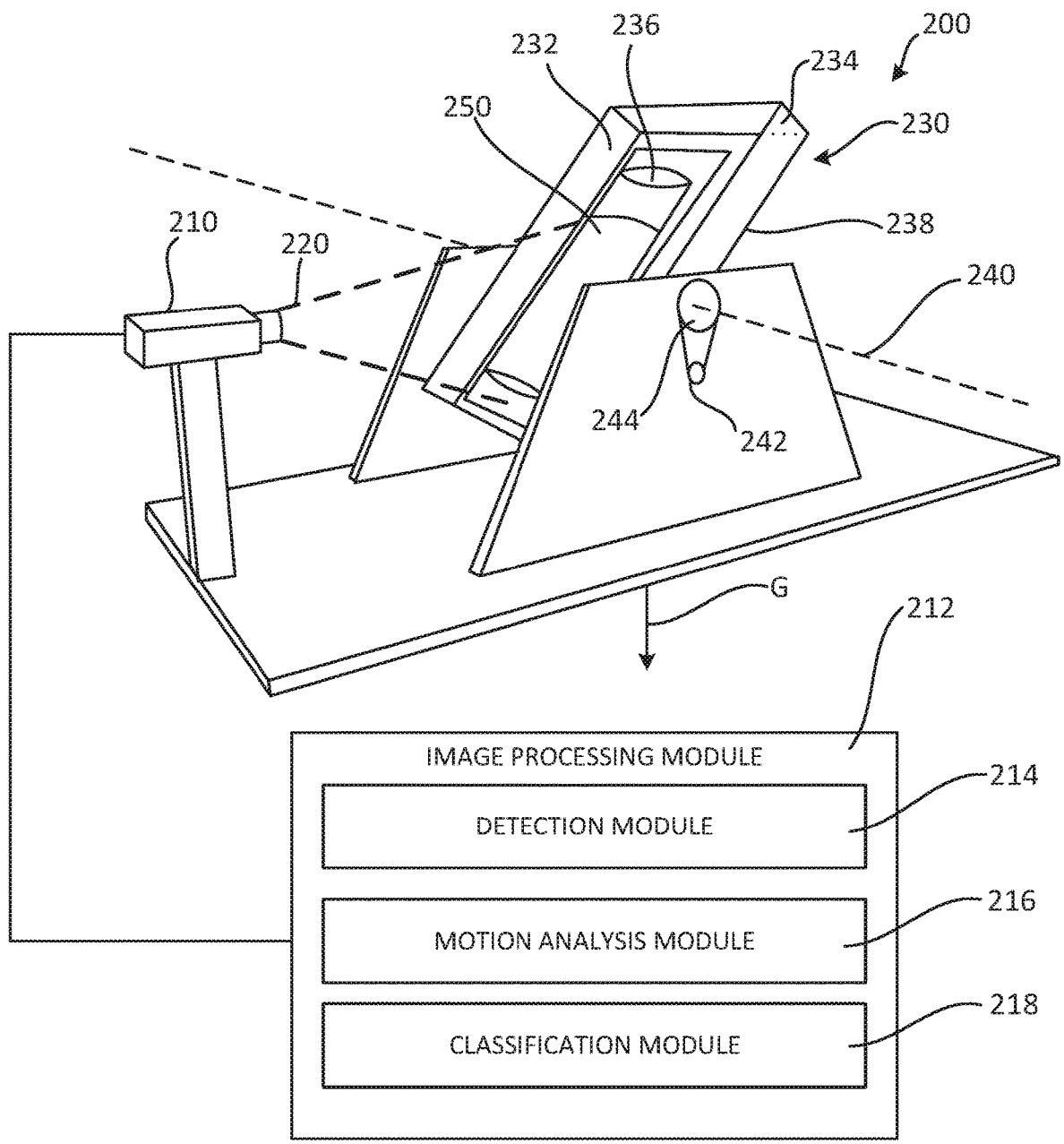
FIG. 2 depicts an embodiment of a hardware setup for automated object detection and classification in a receptacle containing a fluid.

With additional reference to FIG. 2, an embodiment of a system 200 for automated detection and classification of objects is depicted. The system 200 may include a camera 210. The camera 210 may be in operative communication with an image processing module 212. The image processing module 212 may include a detection module 214 for detecting objects from frames of digital image data captured by the camera 210; a motion analysis module 216 for associating detected objects to a motion track and determining at least one motion parameter; and a classification module 218 for classification of detected objects into a class at least based on the motion of the object. Embodiments related to the operation of the image processing module 212 are discussed in greater detail below.

The camera 210 may have a field of view 220 directed toward a receptacle 250 supportably engaged by a receptacle support member 230. Accordingly, the field of view 220 may at least partially encompass a receptacle 250. The receptacle support member 230 may include opposing planar supports 232 and 234. One or both of the opposing planar supports 232 and 234 may be transparent. For instance, the opposing planar supports 232 and 234 may be fully transparent acrylic glass sheets. In any regard, the opposing planar supports 232 and 234 may define a receptacle support region 236. A receptacle 250 may be disposed in the receptacle support region 236 such that the receptacle 250 is supportably engaged between the opposing planar supports 232 and 234. The receptacle may include a fluid that is transparent as well. The receptacle support member 230 may also include a backlight 238 disposed on a side of the receptacle support region 236 opposite the camera 210. For instance, in one embodiment, the backlight 328 may be an LED panel attached to the planar support 234. In any regard, the backlight 238 may illuminate the receptacle support region 236 such that objects in the fluid contained by the receptacle 250 may cast a shadow detectable by the camera 210. That is, objects in the fluid may be detected by the camera 210 in the frames of digital image data captured by the camera 210.

The receptacle support member 230 may be moveable to initiate movement of objects within the fluid contained in the receptacle 250. In this regard, the receptacle support member 230 may be displaceable about an axis 240. For example, a controllable motor (not shown) may be connected to a drive pulley 242. The drive pulley 242 may interact with a driven pulley 244 (e.g. by way of a belt, chain, gear, or the like). The driven pulley 244 may be operatively engaged with the receptacle support member 230. As such, the controllable motor may be activated to initiate movement of the receptacle support member 230 about the axis 240 that may be collinear with an axis of rotation of the driven pulley 242. In an embodiment, the controllable motor may be a stepper motor or the like that may impart two way motion of the receptacle support member 230 about the axis 240. The receptacle support member may be pivoted about the axis 240 in a first direction and returned to a home position where the receptacle 250 may be viewed by the camera 210.

In an embodiment, the axis 240 may be disposed orthogonally relative to the field of view 220 of the camera 210 and the force of gravity, which is represented in FIG. 2 by arrow G. Accordingly, upon displacement of the receptacle support member 250 about axis 240, the force of gravity may act on objects in the receptacle 250 to initiate movement thereof. Upon return of the receptacle support member 230 to a stationary position relative to the camera 210, objects in the receptacle 250 may continue to move under the force of gravity. In turn, the movement of the objects in the receptacle 250 may be recorded as image data by the camera 210.

In an embodiment, the camera 210 may have a resolution of about 3840 pixels by 2748 pixels. Additionally, the camera 210 may be positioned relative to the receptacle support region 236 such that the imaged area has a size of at least about 200 mm by at least about 125 mm. With an image resolution of at least about 3300 pixels by 2030 pixels, each pixel may have a represented physical size of not larger than about 62 microns by 62 microns. In an embodiment, each pixel may have a represented physical size of not larger than about 60 microns. As such, the camera 210 may be operable to detect objects having a size as small as at least 100 microns.

Figure 3:
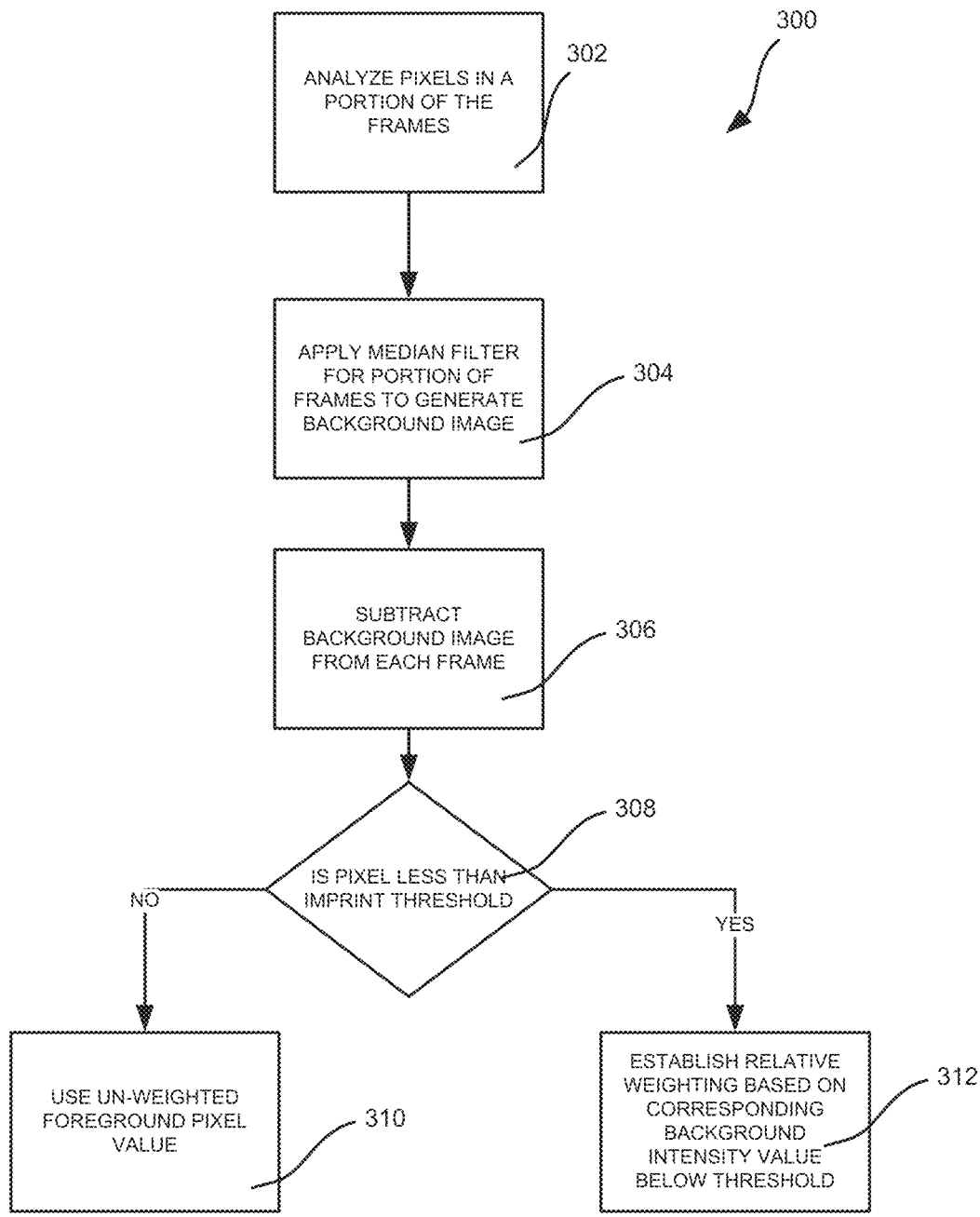
FIG. 3 is a flow chart depicting an embodiment of a method for generation of a foreground image for detection of objects from image data of a receptacle to be analyzed.
Figures 4A, 4B:
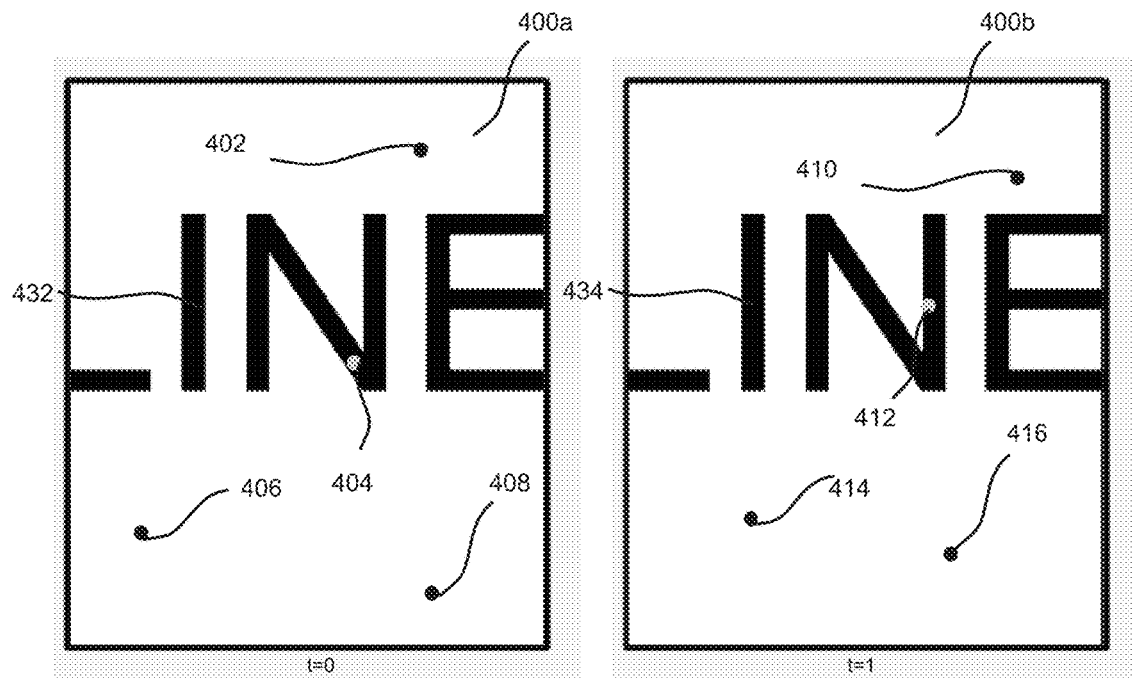
FIGS. 4A-4D depict an embodiment of sequential frames of image data of a receptacle.
Figures 4C, 4D:
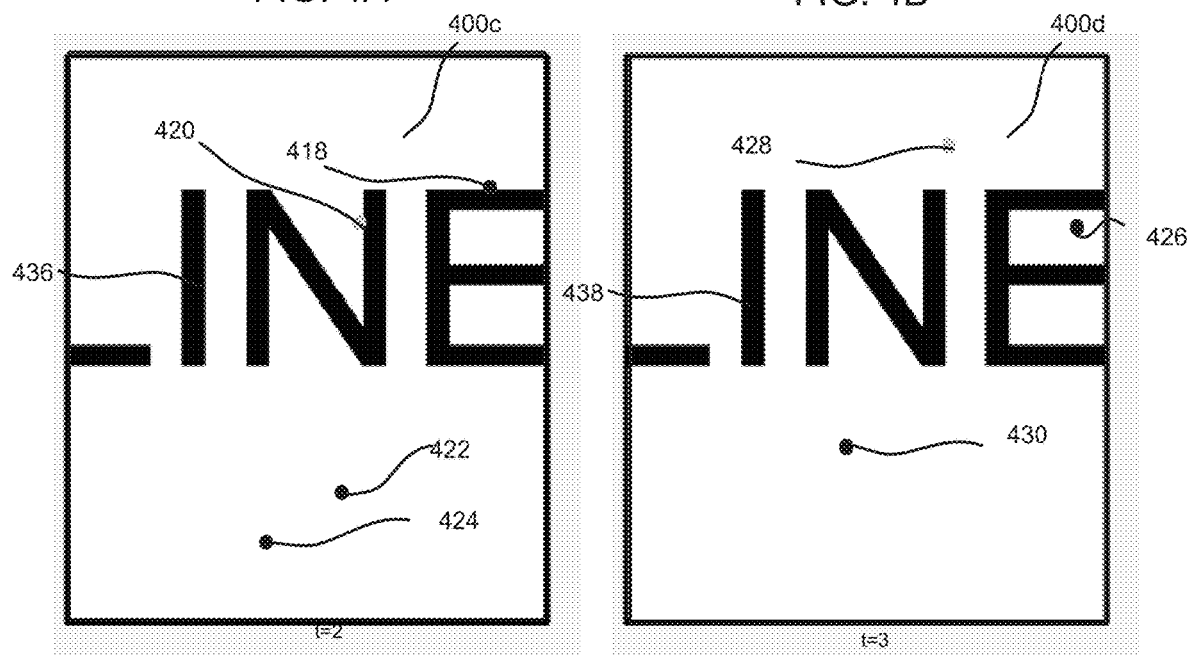

The camera 210 may, as described above in relation to FIG. 1, capture sequential frames of digital image data of the receptacle 250. In turn, the image processing module 212 may be operable to perform image analysis relative to the image data captured by the camera 210 to identify objects appearing in the image data. In this regard, FIG. 3 depicts one such example of a method 300 for processing. As may be appreciated, the method 300 may be performed by a detection module 214 of the image processing module 212.

For instance, the method 300 may include analyzing 302 the pixel values in a portion of the sequential frames of image data collected. Each pixel location in the image data may have a digital number representative of the intensity of the pixel location for the given frame of image data. For instance, for an eight bit image, each pixel location may have at least one pixel intensity value between 0 and 255. For color images, a plurality of intensity values for each pixel location corresponding to different respective color bands may also be provided.

The method 300 may also include applying 304 a median pixel intensity filter to at least a portion (e.g., at least a plurality) of the frames to generate a background image. The background image may comprise median pixel intensity values for each corresponding pixel location of the frames of image data. In turn, static objects appearing in the frames (e.g., information that is imprinted on the transparent bag, imperfections in the frame holding the opposing planar supports 232, 234, or other static objects) may result in corresponding pixel intensity values in a background image (i.e., the static objects may not be filtered from the background image). As such, a median pixel intensity value for the pixel locations corresponding to the static objects may reflect the static objects in the background image. In contrast, for pixel locations corresponding to moving objects, the median pixel intensity values for these pixel locations may not reflect the object that is moving in the portion of the images analyzed. Thus, when the median pixel intensity value is determined for a pixel location corresponding to a moving object, the median pixel intensity value may result in the moving object not appearing in the background image (i.e., the moving objects may be filtered from the background image). Therefore, upon subtraction of the background image from the frames of image data, only moving objects may remain in foreground images generated upon subtraction of the background image from the frame.

As such, median pixel intensity values may be calculated for each pixel location corresponding to the frames of image data. The median pixel intensity values for each pixel location that is determined may be used to generate the background image having the median pixel intensity value determined relative to each respective pixel location. Other approaches to generation of the background image may be used including, for example, determining a mean pixel intensity value for each pixel location relative to the corresponding pixel intensity values of the subset of frames, determining a root mean pixel intensity value for each pixel location relative to the corresponding pixel intensity values of the subset of frames, or by applying some other statistical operation for each pixel location relative to the corresponding pixel intensity values of the subset of frames. In any regard, moving objects appearing in the frames may remain in foreground images generated when the background image is subtracted from the frame of image data.

In an embodiment, in order to generate the background image for a given frame, a number of frames adjacent to the given frame in the sequence of frames being processed may be selected for use in determining a median pixel intensity value for each pixel location of the frame. For instance, a certain number of frames preceding the frame of interest and/or following the frame of interest may be identified. In an embodiment, a total of five frames (e.g., two preceding, two succeeding, and the given frame itself) may be used. It will be appreciated that choosing too many preceding and/or following frames may result in slow changes to the static part of the image data having negative effects on the results. Selection of too few preceding and/or following frames may increase the noise level of the background image as rapidly changing pixel values (e.g., corresponding to moving objects) may not be filtered.

In any regard, for each corresponding pixel location (x,y) for a given image frame (F), the background image (bg( )) may be determined by taking the median pixel intensity value (median(p( ))) across the subset (f) of image frames. Thus, the background image may be generated using the equation:

$$bg(x,y,F) = \text{median}(p(x,y,f), f \in \{(F-k) \ldots (F+k)\}) \quad \text{Equation 1}$$

where (k) is the number of preceding and succeeding frames analyzed in relation to the given frame (F).

As an example, a sequence of four frames 400a, 400b, 400c, and 400d of image data is shown in FIGS. 4A, 4B, 4C, and 4D, respectively. As may be appreciated, frame 400a in FIG. 4A includes a number of darkened pixel areas 402, 404, 406, 408, and 432. As way of example, darkened pixel area 432 may correspond to a static object (e.g., information imprinted on the flexible container). Frame 400b in FIG. 4B includes a number of darkened pixel areas 410, 412, 414, 416, and 434. As may be appreciated, the darkened pixel area 434 may be the same as darkened pixel area 432 in image 400a. Thus, one may appreciate that darkened pixel areas 432 and 434 may correspond to static portions of the image (e.g., corresponding to the information imprinted on the bag in this case that appears in both images 400a and 400b). Frame 400c in FIG. 4C includes a number of darkened pixel areas 418, 420, 422, 424, and 436. Darkened pixel area 436 may again correspond to the imprinted information on the bag. Frame 400d in FIG. 4D includes a number of darkened pixel areas 426, 428, 430, and 438. Darkened pixel area 438 may correspond to the imprinted information on the bag.

Figure 5:
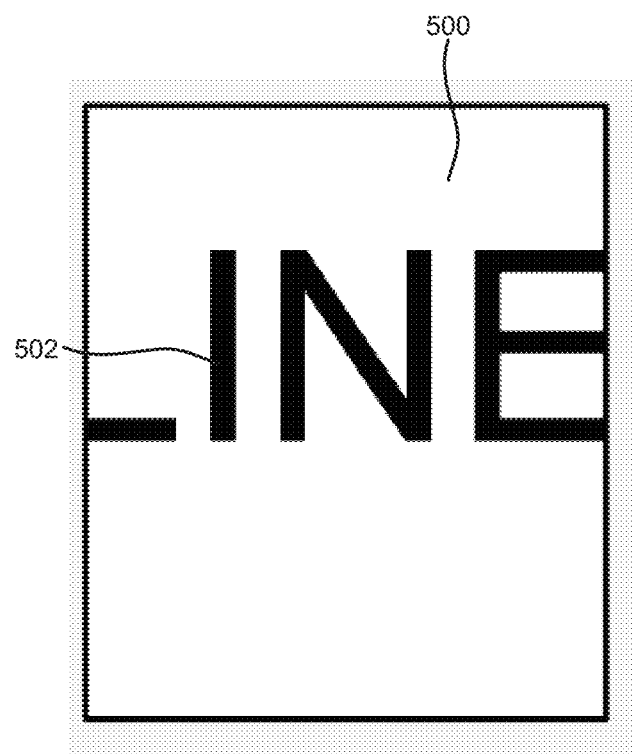
FIG. 5 depicts an embodiment of a background image generated based on the portion of sequential image frames of FIG. 4.
Figure 6A:
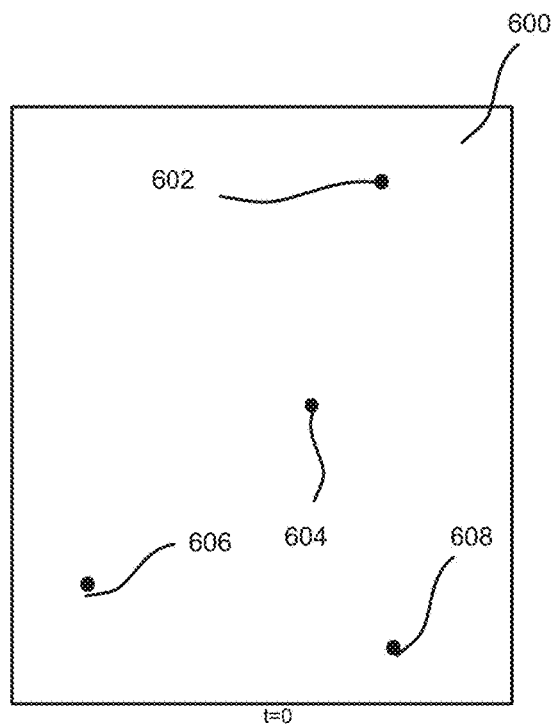
FIGS. 6A-6D depict an embodiment of foreground images corresponding to the portion of sequential frames of image data of FIGS. 4A-4D.
Figure 6B:
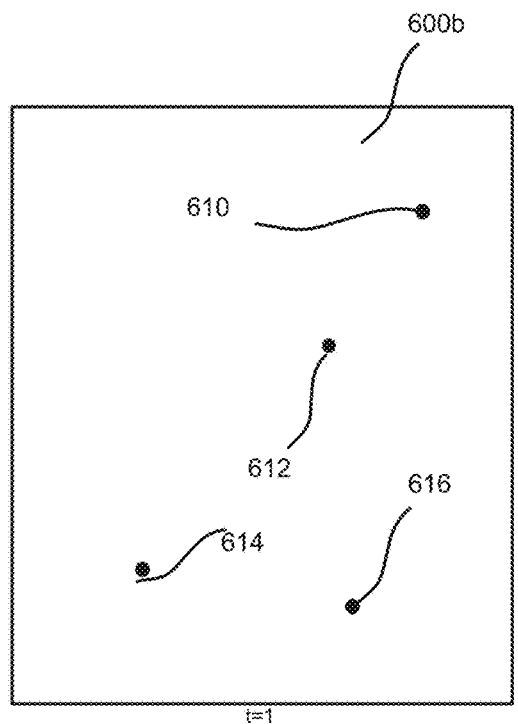
Figure 6C:
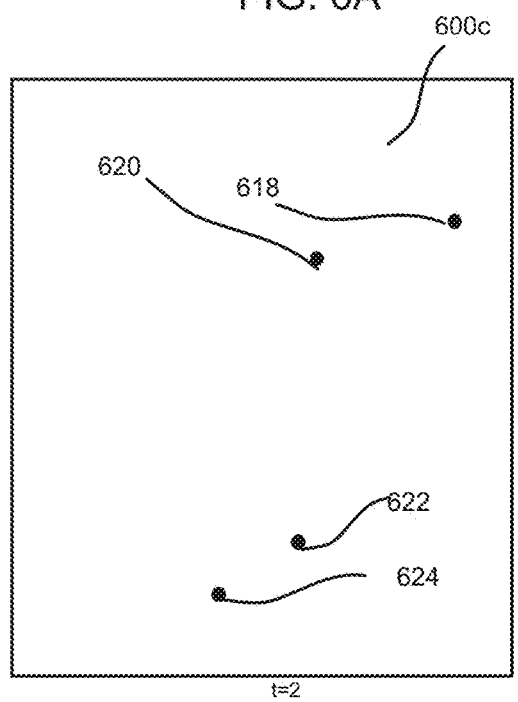
Figure 6D:
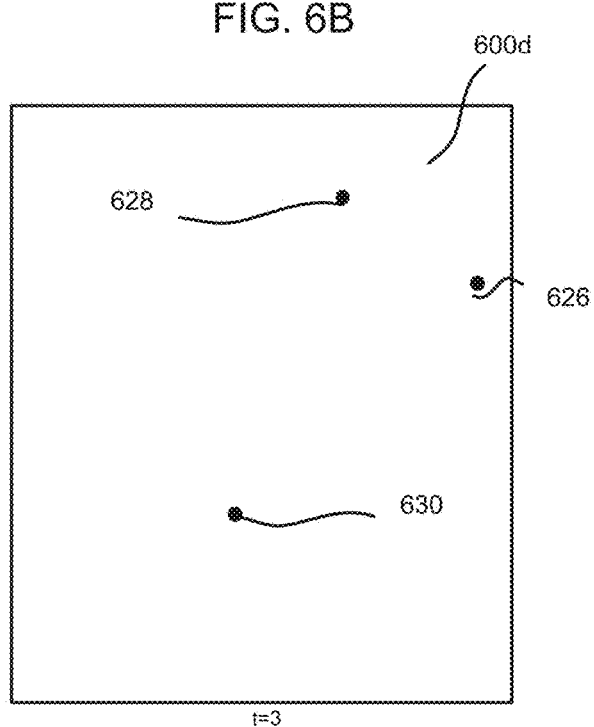

When the median pixel intensity values for each corresponding pixel location of images 400a, 400b, 400c, and 400d are computed, the darkened pixel areas 432, 434, 436, and 438 corresponding to the static portions of the image (e.g., the imprinted information) may each appear in the same corresponding pixel locations in each image. As such, the median pixel intensity values for these pixel locations in a background image 500 may include pixel intensity values 502 in the background image 500 shown in FIG. 5 that correspond to the static portions of the image reflected in darkened pixel areas 432, 434, 436, and 438. However, the darkened pixel areas 402, 404, 406, 408, 410, 412, 414, 416, 418, 420, 422, 424, 426, 428, and 430 may each only be darkened in corresponding pixel locations in one of the four images. As such, the median pixel intensity value for the pixel locations through which the objects corresponding to darkened pixel areas 402-430 pass may be relatively low, thus not appear or appear only as very low intensity values in the background image 500.

In this regard, returning to FIG. 3, the method 300 may include subtracting 306 the background image 500 from each of the frames of image data 400a, 400b, 400c, and 400d to generate corresponding foreground images 600a, 600b, 600c, and 600d as shown in FIGS. 6A, 6B, 6C, and 6D, respectively. As may be appreciated, the static portions (e.g., darkened areas 432-438) of the frames 400a-400d may thus be removed by subtraction of the background image 500. In turn, the remaining darkened pixel areas 402-430 from frames 400a-400d may be identified as moving objects 602, 604, 606, 608, 610, 612, 614, 616, 618, 620, 622, 624, 626, 628, and 630 in foreground images 600a-600d in FIGS. 6A-6D.

Accordingly, static portion of the image may correspond to non-transparent portions of the receptacle (e.g., portions that may be translucent and/or opaque). For example, imprints corresponding to lettering, images, or the like may be applied to the receptacle (e.g., for the purpose of labeling the contents of the bag). In this regard, it may be appreciated that darkened pixel areas 432-438 that appeared in frames 400a-400d may correspond to such imprinted portions of a receptacle (e.g., a portion of the word "SALINE"). Thus, as those imprinted portions may remain static in the frames 400a-400d, the imprinted portions are part of the background image 500 and may be removed from the foreground images 600a-600d.

However, the non-transparent portions (e.g., imprinted portions) of the receptacle may further affect the identification of moving objects. For instance, with reference to FIGS. 4A-4C, darkened pixel areas 404, 412, 418, and 420 are all near or overlapping with the areas corresponding to the imprinted portions of the receptacle. In this regard, when the static portions of the corresponding frames are removed by way of subtraction of the background image 500, the resulting pixel intensity values for the corresponding objects 604, 612, 618, and 620 may be reduced. That is, it may be harder to detect objects that overlap with the imprinted, non-transparent areas of the receptacle.

Accordingly, pixel values in the foreground images 600a-600d may be weighted so that differences in intensities between the frames 400a-400d and background image 500 may be intensified in the resulting foreground images 600a-600d. Specifically, pixels in the foreground image may be multiplied by a weighting factor. The relative magnitude of the weighting factor may be inversely proportional to the intensity of a corresponding pixel in the background image 500. That is, for a foreground pixel whose corresponding background pixel is dark (i.e., has a relatively low intensity) may be multiplied by a larger weighting factor than a foreground pixel whose corresponding background pixel is light (i.e., has a relatively high intensity).

In a specific example, a weighting function may be generated. The weighting function may be dependent upon the original digital number value for the intensity of the frame (x), a maximum amplification parameter (a), an increase rate (b) and an imprint threshold (u). The maximum amplification parameter a, the increase rate b, and the imprint threshold u may be selectable parameters that may be defined by a user (e.g., determined empirically) to tune the results for a particular application. In turn, the weighting function used to generate the weighting factor w may be provided as:

$$w = \begin{cases} 1 & \text{if } x \geq u \\ (-(a-1)b^{x-u} + a)x & \text{if } x < u \end{cases} \quad \text{Equation 2}$$

In this regard, returning to FIG. 3, the method 300 may include determining 308 if a pixel is less than the imprint threshold. If the intensity value for the pixel in the frame is less than the imprint threshold u (i.e., if x is greater than or equal to u), the method 300 may include establishing the weighting factor using the weighting function and multiplying the resulting intensity value in the foreground image by the weighting factor. However, if the intensity value for the pixel in the frame is greater than the imprint threshold (e.g., if x is less than u), the value of the pixel in the foreground may be unweighted (i.e., multiplied by 1). In this regard, foreground images 600a-600d that reflect identified objects from the frames 400a-400d.

Additional image analysis techniques may be applied to the foreground images 600a-600c by the detection module 214. For instance, the foreground images 600a-600d may be transformed into a binary image. The transformation of the foreground images 600a-600d into a binary image may include establishing a binary transformation threshold value for pixel intensity. Pixel values in the foreground images 600a-600d that fall below the binary transformation threshold value for pixel intensity may be represented with a 1 indicating the pixel is indicative of an identified object. Conversely, pixel values in the foreground images 600a-600d that are above the binary transformation threshold value for pixel intensity may be represented with a 0 indicating the pixel is not indicative of an identified object.

Additionally, morphological operations may be applied to the foreground images 600a-600d. Specifically, a closing operation may be applied to the identified objects in the foreground images 600a-600d. As an example, if one or more pixels not identified as corresponding to an object are completely enclosed by other pixels identified as corresponding to an object, the pixels not identified corresponding to the object may be modified as being identified as pixels corresponding to an object, thus "closing" the object. Other common morphological operations may also be performed without limitation such as, for example, erosion, dilation, or opening.

Figure 7:
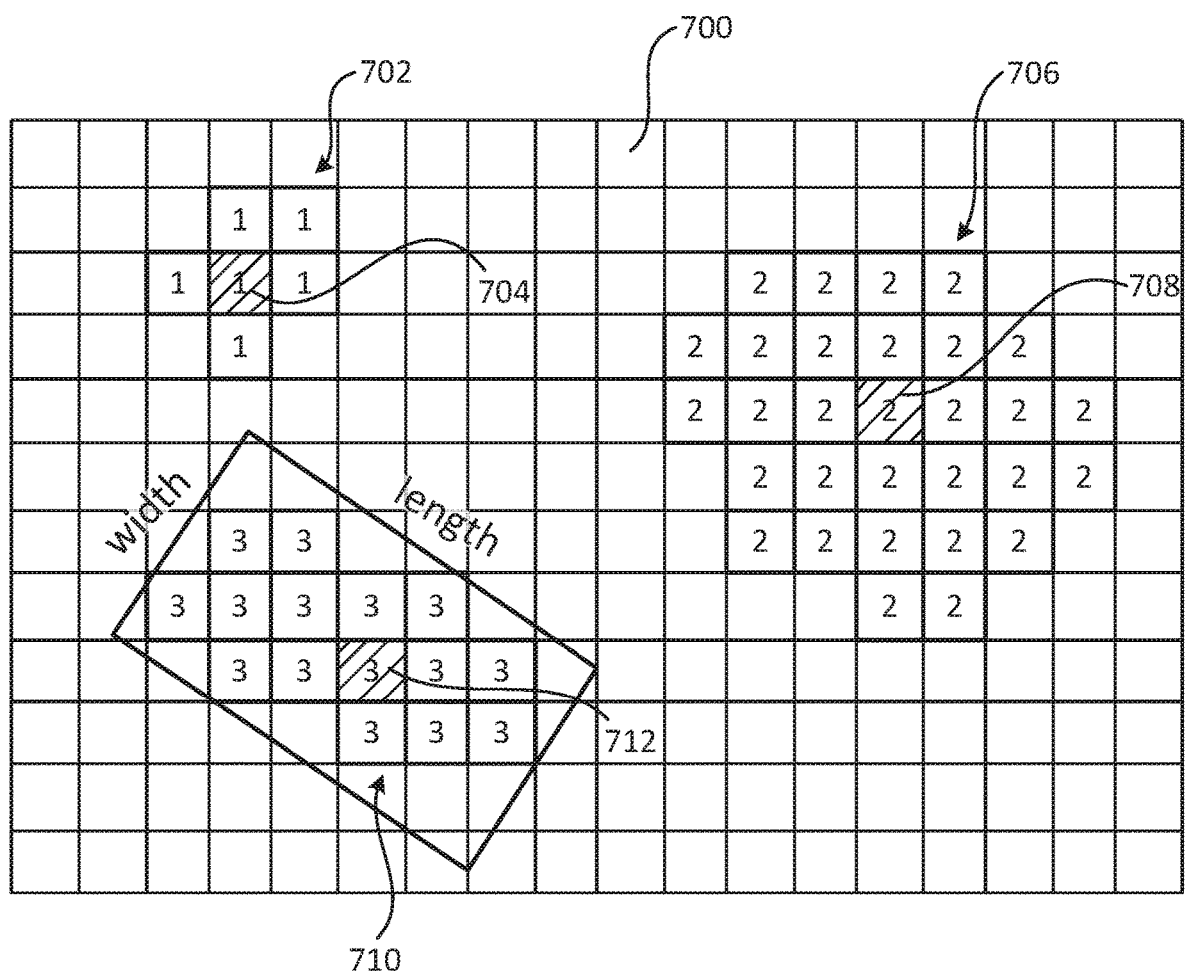
FIG. 7 depicts an embodiment of identified objects in a foreground image.

Further still, the foreground images 600a-600d may undergo a labeling operation, wherein objects appearing in the foreground images 600a-600d are assigned a label and/or features of the object may be identified. For instance, with reference to FIG. 7, three objects 702, 706, and 710 may have been identified for the portion of the foreground image 700 shown. Thus, for object 702, all pixels corresponding to the object may be identified with a common identifier (e.g., "1" in the case of object 702). Additionally, the pixel corresponding to the center of mass 704 of the object 702 may be identified. Similarly, for object 706, each pixel corresponding to the object 706 may be identified with a "2" and the pixel corresponding to the center of mass 708 may be identified. Further still, for object 710, each pixel corresponding to the object 710 may be identified with a "3" and the pixel corresponding to the center of mass 712 may be identified. Also, for each object 702, 706, and 710, a length and width may be measured as shown with respect to object 710. Other features for each object could also be identified such as, for example, the average intensity of all pixels corresponding to the object, the ratio of the length to width for the object, the area of the object, and/or the color intensities for a color image.

Once the objects from the foreground images 600a-600d have been identified, at least one motion parameter for each object may be determined 140 as described briefly above in relation to FIG. 1. It may be that the motion analysis module 216 may be operable to perform a method 800 shown in FIGS. 8A-8B to determine 140 the motion parameter. The method 800 generally results in identified objects in the sequence of frames of image data being associated with a motion track. The motion track may then be used to determine at least one motion parameter for the object associated with the motion track. As such, the method 800 may generally include initiation of motion tracks, association of objects in the sequence of image frames to motion tracks, and discontinuation of motion tracks. In the following discussion, association of an identified object to an existing motion track is initially discussed. Thereafter an approach for motion track initiation is discussed. Thereafter, motion track maintenance (e.g., deletion and discontinuation of motion tracks) is discussed.

With respect to association of an object to an existing motion track, multiple object observations may be made in the sequential frames of image data. In this regard, each object observation identified in a given frame may be associated with a motion track that has been generated based on object observations in previous ones of the frames of image data. For example, the method 800 may include maintaining 802 a first motion track that is based on object observations in previous frames. For illustration of this concept, FIG. 9 includes an image 902 for a time t=3 and a compilation image 900 that includes a combination of a plurality object observations from images prior to image 902 and corresponding to times t=0, 1, 2. In this regard, it may be appreciated that in the compilation image 902, a number of motion tracks (e.g., motion track 910, 920, 930, and 940) may be based on previous object observations. Accordingly, motion track 910 may be based on object observations 912a, 912b, and 912c. That is, object observation 912a may have appeared in an image corresponding to time t=0, object observation 912b may have appeared in an image corresponding to time t=1, and object observation 912c may have appeared in an image corresponding to time t=2. Similarly, motion track 920 may be based on object observations 922a, 922b, and 922c, motion track 930 may be based on object observations 932a, 932b, and 923c, and motion track 940 may be based on object observations 942a, 942b, and 942c.

In turn, based on the object observations 912a-c, 922a-c, 932a-c, and 942a-c from images of times t=0, 1, and 2 and motion track parameters for each corresponding motion track, an estimated position of an object observation in next subsequent frame (i.e., time t=3) may be determined based on the respective motion tracks 910, 920, 930, and 940. That is, for motion track 910, an anticipated location 914 of object 912 in an image of time t=3 may be determined and is represented in compilation image 900. Similarly, an anticipated object position 924 of object 922 at time t=3 may be determined based on track 920, an anticipated object position 934 of object 932 at time t=3 may be determined based on track 930, and an anticipated object position 944 of object 942 at time t=3 may be determined based on track 940. The anticipated object positions 914, 924, 934, and 944 may be calculated based on an estimated state vector for each object that may be determined at least in part based on the respective motion track for an object.

For example, one approach may include using a Kalman filter to estimate the state vector (x) for each object associated with a motion track. The state vector x may be defined by a position ($pos_x$, $pos_y$) and a velocity ($vel_x$, $vel_y$) of an object. In turn, estimates of constant speed and direction may be used to generate difference equations to determine the state vector of the object at time t=i using the equations:

$$pos_x(i) = pos_x(i-1) + vel_x(i-1)\Delta t \qquad \text{Equation 3}$$

$$pos_y(i) = pos_y(i-1) + vel_y(i-1)\Delta t \qquad \text{Equation 4}$$

$$vel_x(i) = vel_x(i-1) \qquad \text{Equation 5}$$

$$vel_x(i) = vel_x(i-1) \qquad \text{Equation 6}$$

where $\Delta t$ represents the amount of time elapsed between frames. Accordingly, anticipated object positions 914, 924, 934, and 944 may be calculated using Equations 3-6 for each motion track in an image.

In this regard, in image 904, the motion tracks 910, 920, 930, and 940 are shown in relation to the object observations 912c, 922c, 932c, and 932c from the image of time t=2. Also, object observations 952, 954, 956, and 958 are shown, which were identified from image 902 at time t=3. Furthermore, anticipated object positions 914, 924, 934, and 944 are represented in image 904. Returning to FIG. 8A, the method 800 may include establishing 804 a predicted area for an object in a subsequent frame. One such approach for establishing 804 the predicted area comprises a gating operation. In the gating operation, an ellipsoidal gate may be defined with the center of the ellipsoidal gate centered at the anticipated object position. In this regard, the ellipsoidal gate may encompass the predicted area for an object in a subsequent image.

Figure 9:
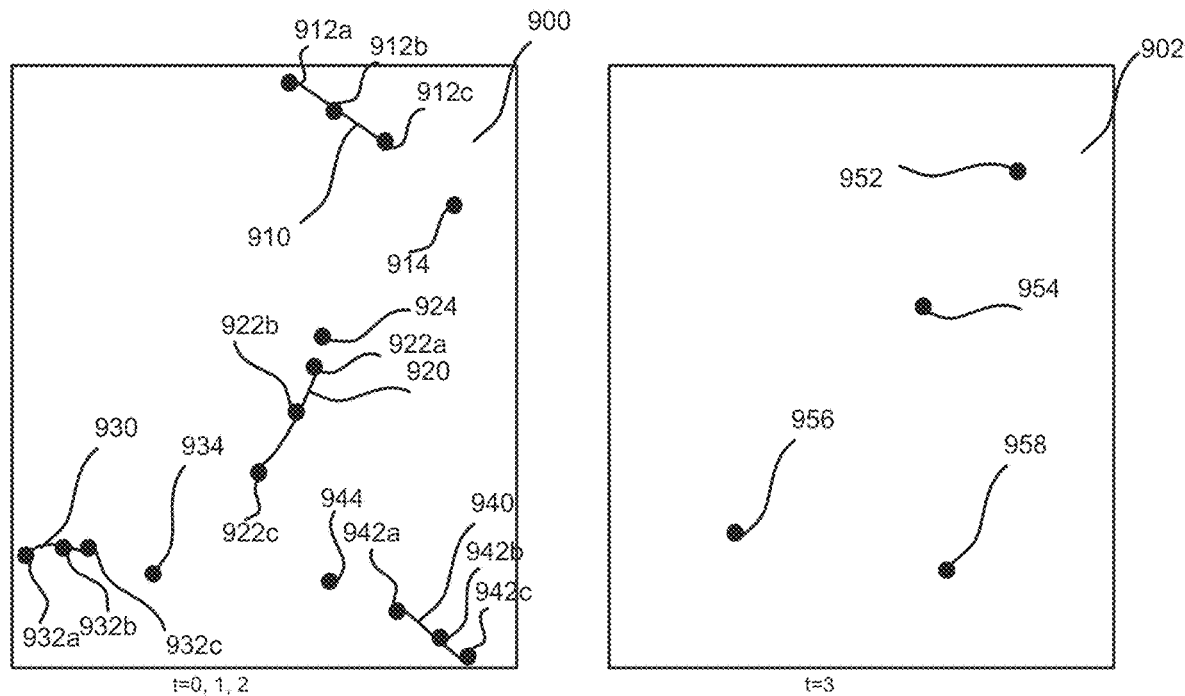
FIG. 9 depicts an embodiment of images used in associating an object observation to a motion track.
Figure 9:
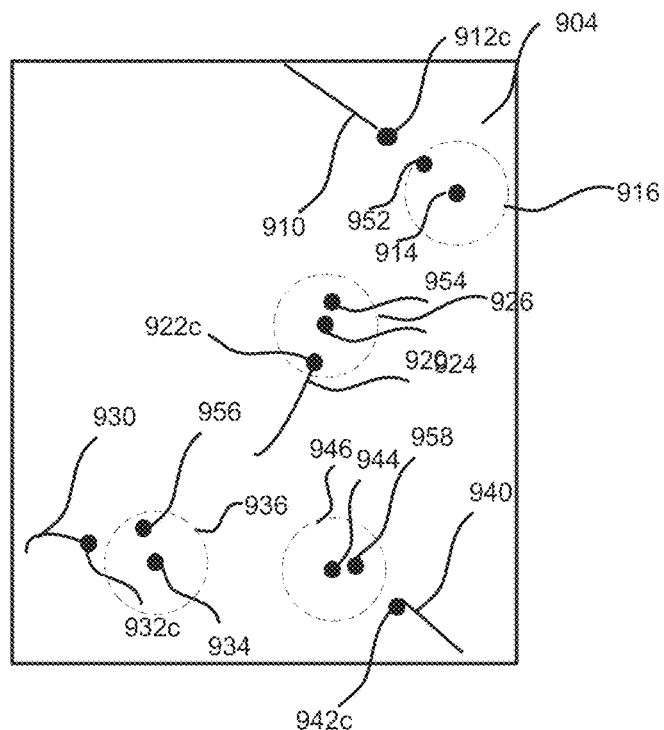

In this regard, as shown in FIG. 9, image 904 includes a gate 916 corresponding to motion track 910, a gate 926 corresponding to motion track 920, a gate 936 corresponding to motion track 930, and a gate area 946 corresponding to motion track 940. The gate may define the maximal allowed distance between the anticipated object position and an object observation to be associated with the track to which the gate corresponds. As such, gate may represent a defined gate threshold G. In turn, the distance between an object observation (z) and an anticipated object position ($\hat{z}$) may be defined as:

$$d^2 = \frac{(\hat{z}_x - z_x)^2}{\sigma_x^2} + \frac{(\hat{z}_y - z_y)^2}{\sigma_y^2} \leq G \qquad \text{Equation 7}$$

where $\sigma_x^2$ and $\sigma_y^2$ are variances of the measurement prediction errors in the x and y directions, respectively. Alternatively, Equation 7 may be represented using vectors as:

$$d^2 = \tilde{z}^T S^{-1} \tilde{z} \leq G \qquad \text{Equation 8}$$

$$\tilde{z} = \begin{bmatrix} (\hat{z}_x - z_x) \\ (\hat{z}_y - z_y) \end{bmatrix} \qquad \text{Equation 9}$$

where S is a measurement prediction covariance matrix and $d^2$ is assumed to be chi-squared distributed with two degrees of freedom. The assumption of $d^2$ may be because the value is calculated as the sum of the squares of two normalized Gaussian distributed random values. In this regard, by defining the probability of an object observation lying inside the gate ($P_G$), the threshold G may be calculated according to the cumulative distribution function of the chi-squared distribution or as:

$$G = -2 \log(1 - P_G) \qquad \text{Equation 10}$$

Furthermore, the size of the ellipsoidal gate ($V_G$) may be computed using the equation:

$$V_G = \pi \sqrt{|S|} G \qquad \text{Equation 11}$$

where |S| is the determinant of S. For example, a gate probability $P_G$ of 99.9% may be defined. Accordingly, the resulting gate size may be 13.8.

In any regard, once the size of the gate is determined, the gate may be centered at the anticipated object position. For instance, returning to FIG. 9, gate 916 may be centered at anticipated object position 914, gate 926 may be centered at anticipated object position 924, gate 936 may be centered at anticipated object position 934, and gate 946 may be centered at anticipated object position 944. In this regard, with returned reference to FIG. 8, the method 800 may include determining 806 if an object observation is detected within the predicted area for the object. That is, it may be determined if an object observation is located within the gate corresponding to the predicted area of an object. The method 800 may also include determining 808 whether more than one object observation is located within the predicted area.

If only one object is observed to be located within the predicted area, the method 800 may include associating 810 the object observation located in the predicted area to the motion track corresponding to the predicted area.

As such, in FIG. 9, it may be appreciated that object observation 952 is located within gate 916 that corresponds to the predicted area of an object for motion track 910. As such, object observation 952 may be associated 810 with motion track 910. Similarly, as object observation 954 is the only object in gate 926, object observation 954 may be associated 810 with motion track 920. Further still, as object observation 956 and 958 are the only object observations in gates 936 and 946, respectively, object observation 956 may be associated 810 with motion track 930 and object observation 958 may be associated with motion track 940.

Figure 8A:
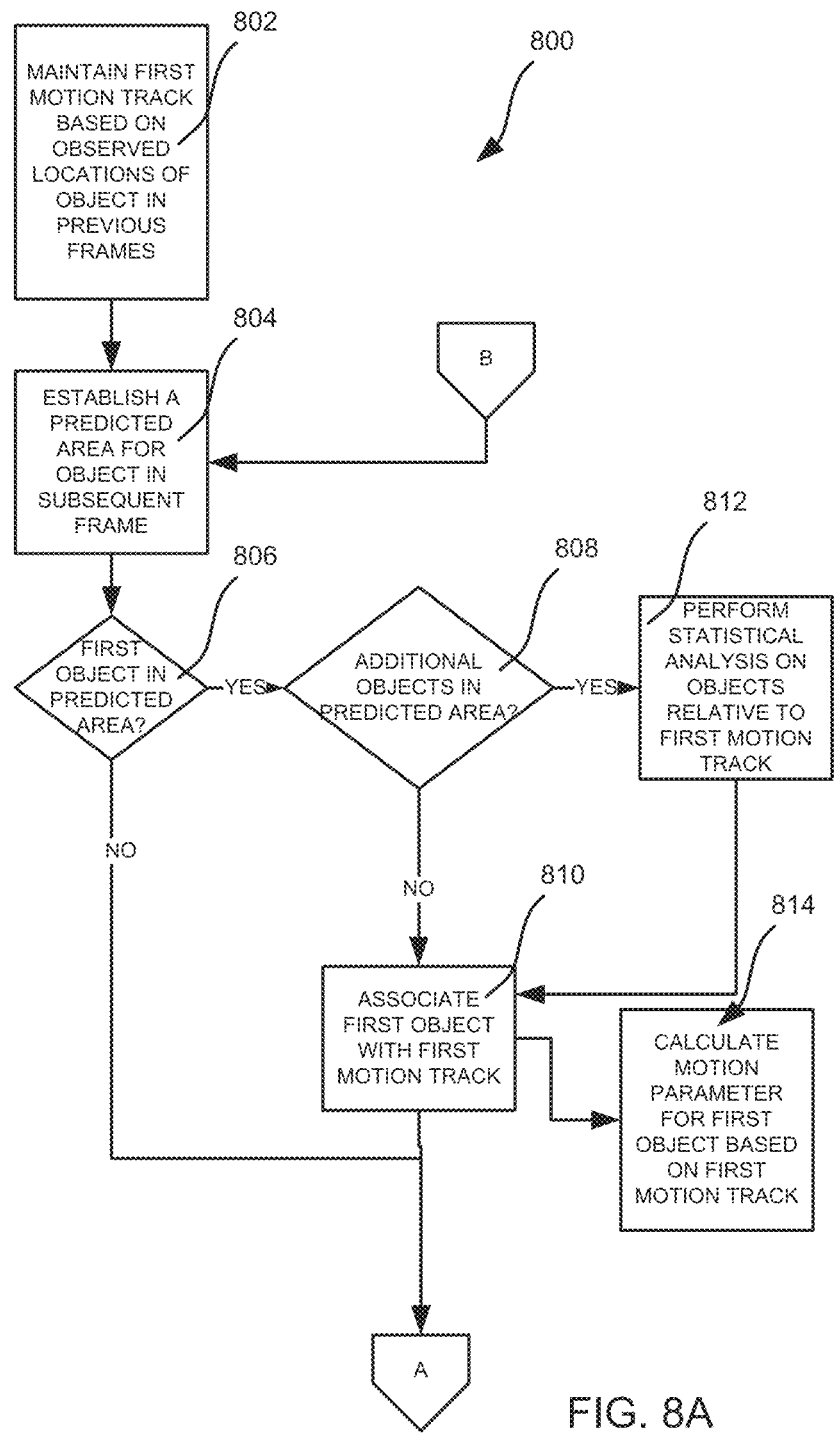
FIGS. 8A and 8B depict an embodiment of a motion analysis method for use in generation and management of motion tracks related to detected objects in a receptacle.
Figure 10:
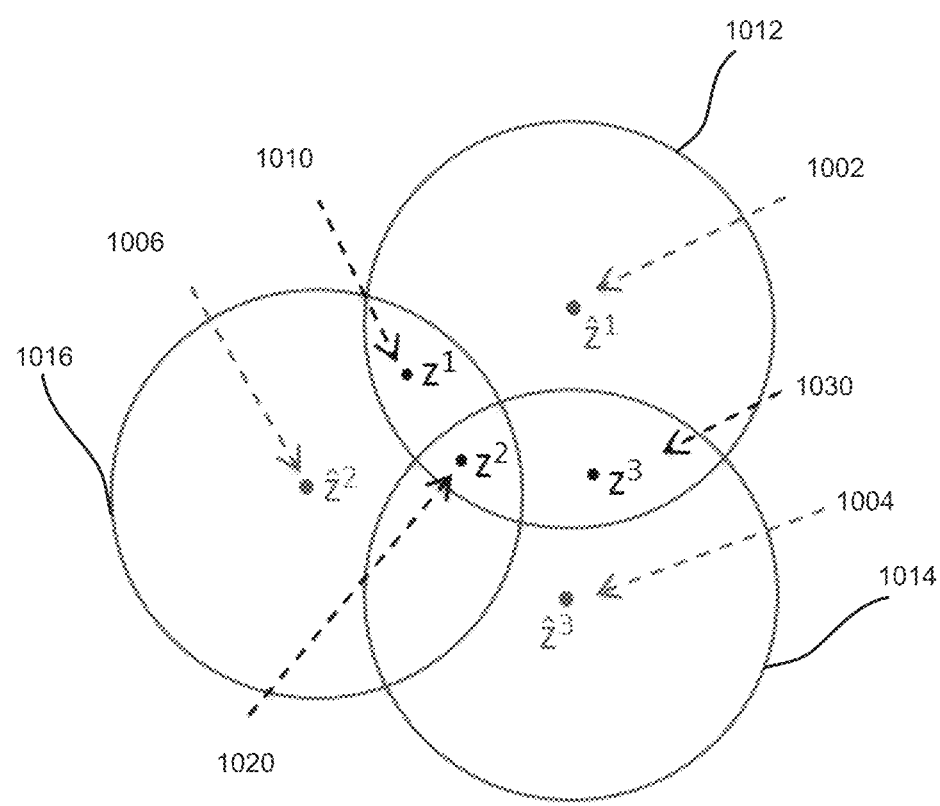
FIG. 10 depicts an embodiment in which statistical analysis may be used to associate one of a plurality of object observations in a predicted area in which an object of a motion track is predicted to appear in a frame of image data.

With continued reference to FIG. 8A and additional reference to FIG. 10, it may be determined 808 if more than one object observation is in the predicted area for a track. In the case where more than one object observation is located in a predicted area of an object for a motion track, the method 800 may also include performing 812 an analysis on the object observations relative to the motion track to determine which of the plurality of object observations located in the predicted area should be associated with the track. For example, the analysis may include a statistical analysis such as a global nearest neighbor operation, a joint probabilistic data association (JPDA), multiple hypothesis tracking (MHT), another appropriate statistical analysis, or combinations of statistical analysis approaches.

For example, FIG. 10 illustrates one example of a scenario in which more than one object observation is located in a gate corresponding to an anticipated object position for a motion track. FIG. 10 illustrates three anticipated object positions 1002, 1004, and 1006 each corresponding to a different respective motion tracks. Additionally, gates 1012, 1014, and 1016 are shown. Gate 1012 may correspond to a motion track associated with the anticipated object position 1002, gate 1014 may correspond to a motion track associated with the anticipated object position 1004, and gate 1016 may correspond to a motion track associated with the anticipated object position 1006. Furthermore, FIG. 10 depicts object observations 1010, 1020, and 1030.

Accordingly, gate 1012 encompasses all three object observations 1010, 1020, and 1030. Gate 1014 encompasses object observations 1020 and 1030. Gate 1016 encompasses object observations 1010 and 1020. In this regard, none of the gates 1012, 1014, or 1016 encompass only a single object observation. In turn, a statistical analysis may be performed to determine the appropriate association between each motion track and the plurality of object observations located within the predicted areas for the motion tracks. For example, the statistical analysis may determine, based on an analysis involving the position of the object observations in a gate for a motion track and the anticipated object position, which of the plurality of object observations to associate with the motion track. That is, for the motion track associated with anticipated object position 1002, each object observation 1010, 1020, and 1030 may be analyzed in relation to the anticipated object position 1002 to select an object observation from the object observations 1010, 1020, and 1030 for association with the motion track. Similarly, for the motion track associated with anticipated object position 1004, each object observation 1020 and 1030 may be analyzed in relation to the anticipated object position 1004 to select an object observation from the object observations 1020, and 1030 for association with the motion track. Further still, for the motion track associated with anticipated object position 1006, each object observation 1010 and 1020 may be analyzed in relation to the anticipated object position 1006 to select an object observation from the object observations 1010 and 1020 for association with the motion track.

As described above, one or more of a GNN, JPDA, or MHT approach may be utilized in the foregoing case to determine object associations where multiple objects may be detected in a gate corresponding to a motion track. As may be appreciated any of the mentioned approaches or any other approach for use in determining appropriate associations may be used individually. Furthermore, combined approaches that utilize a plurality of the approaches for association of objects to motion tracks in a single frame may be employed. For example, each approach may be utilized to separately determine associations for situations where multiple objects are detected in a gate for a motion track. A combination of the separately derived associations may be utilized. Furthermore, if a confidence of association for a particular object using a particular approach exceeds a threshold, the approach used to generate the association with high confidence may be used to associate the particular particle. In this case, other approaches may be used to associate other objects in the frame.

Additionally, in an embodiment where JPDA is employed, an adaptive approach to JPDA may be utilized. For example, as may be appreciated, in a JPDA approach, a probability that a detected object is to be associated with a given motion track may be calculated. The probability of association of an object to a track may utilize a value corresponding to the probability of detecting an object. In an embodiment, this value related to the probability of detecting an object may be adaptive. Specifically, the value for the probability of detecting an object may be at least partially based on the intensity value of the object as it appears in the foreground image. The value of the probability of detection may be proportional to the intensity value of the object. Thus, for objects with higher intensity values in the foreground image, the probability of detection used in the JPDA analysis may also be higher, whereas lower intensity values in the foreground image may result in the probability of detection being lower as well. This adaptive approach to JPDA may be used to improve object association in the case where JPDA may be used to associate an object to a motion track.

With further reference to FIG. 8A, once an object observation is associated 810 with a motion track, at least one motion parameter corresponding to the motion track may be calculated 814. That is, as the motion track may include observed locations of an object in a sequence of frames of image data with known time differentials between the frames of the images, motion parameters related to velocity and acceleration may be determined. For example, a number of motion parameters may be determined including, for example, average vertical motion direction, average vertical acceleration, average vertical motion variance, average horizontal motion direction, average horizontal acceleration, average horizontal motion variance, average total motion, average total motion acceleration, average total motion variance, and track length.

Figure 8B:
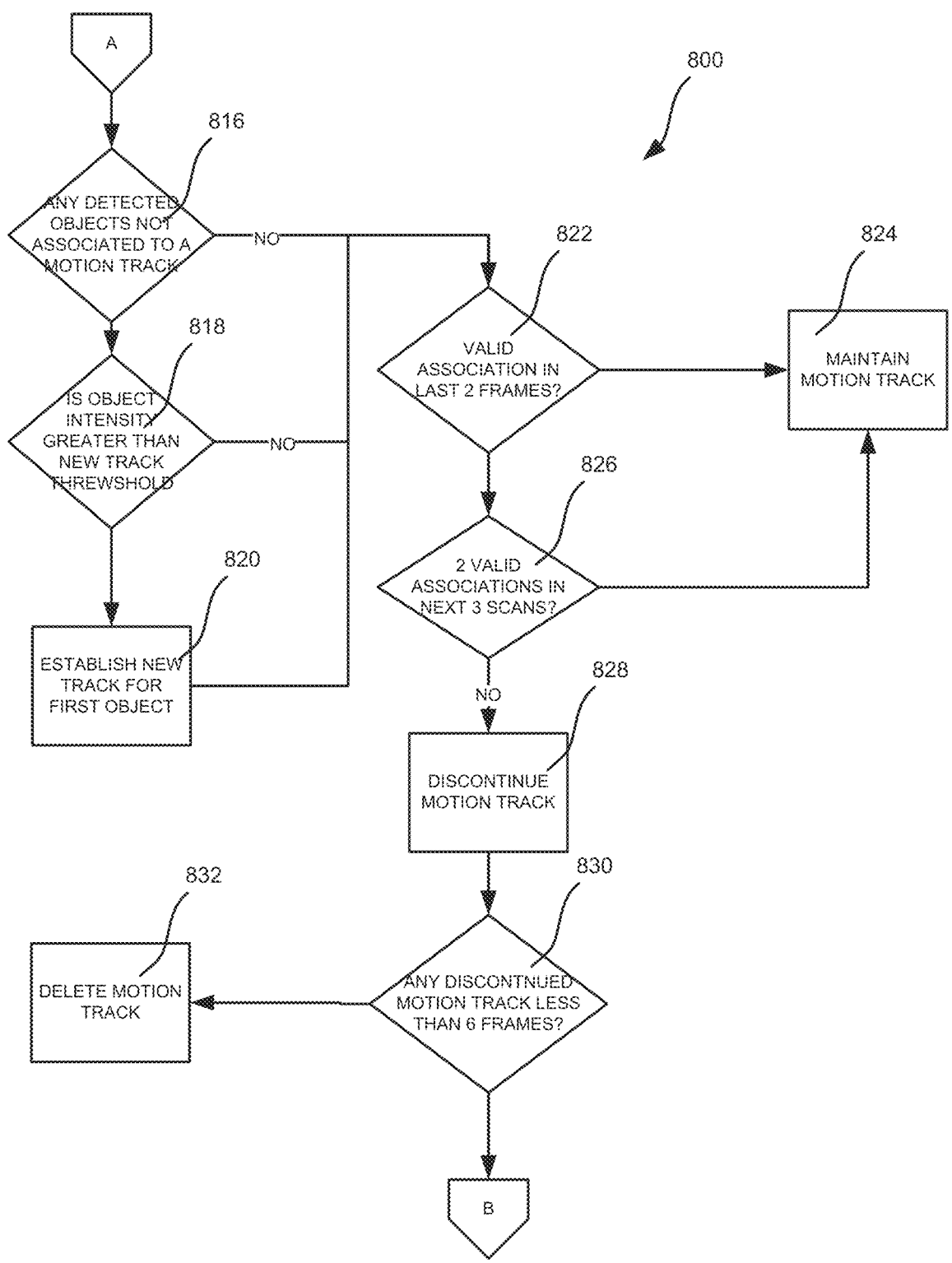

With further reference to FIG. 8B, once object observations within the predicted areas for existing motion tracks have been associated, the method 800 may include determining 816 if any object observations in the foreground image have not been associated with a motion track. If there are object observations that are identified that are not associated with a track, the method 800 may further include determining 818 if the intensity of the object observation is greater than a predetermined new track threshold value. The predetermined new track threshold value may be greater than the binary transformation threshold used to create the binary image. That is, even if the object observation identified is included in the binary image transformation, the intensity of the object observation may still not be great enough to trigger establishing 820 a new track. If the intensity of the object observation exceeds the predetermined new track threshold, then the method 800 may include establishing 820 a new motion track for the object.

If no unassociated object observations are determined 816 or if it is determined 818 no object observations exceed the predetermined new track threshold or upon establishing 820 all the new tracks for unassociated objects, the method may include determining 822 for each valid track if a valid object observation association has been made in the previous two frames of the sequential frames of image data. If associations of object observations have been made in each of the two previous frames, the motion track may be maintained 824. If valid associations have not been made in the previous two frames, the method 800 may include determining 826 if at least two valid associations are made to a motion track in the subsequent three frames. If at least two valid object observation associations are made to the track in the next three frames, then the motion track may be maintained 824. If not, the motion track may be discontinued 828. While a motion track is discontinued (i.e., subsequent predicted areas for an object may not be made), the motion track may still be used to generate at least one motion parameter for the object observations corresponding to the motion track. Additionally, it may be determined 830 if any discontinued motion track is maintained for less than six consecutive frames. If the motion track is less than six frames in length, then the motion track may be deleted 832 and not used to generate motion parameters associated with an object. That is, a motion track that is less than six frames in length may be deleted and not considered any further in the classification of objects. Once any discontinued motion tracks that are less than six frames in length have been deleted, the method 800 may repeat for a subsequent frame.

Figure 11:
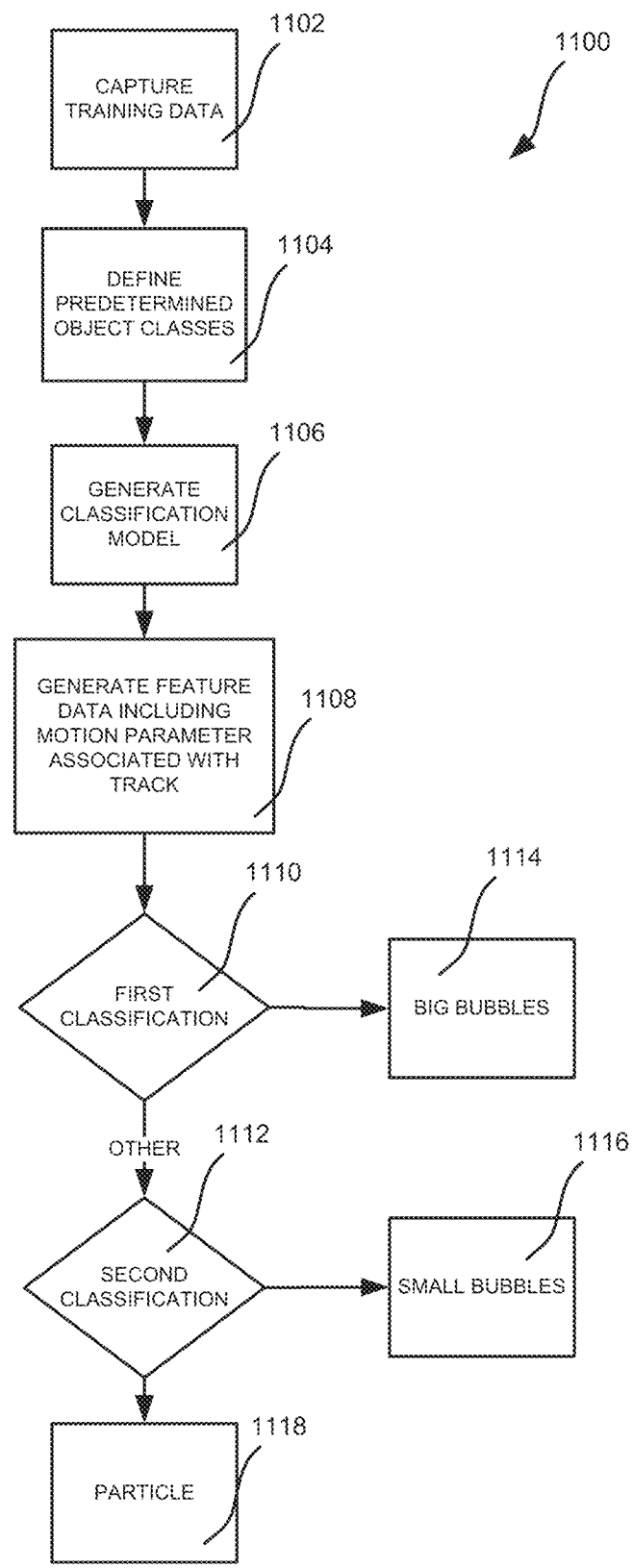
FIG. 11 is a flow chart depicting an embodiment of a method for classification of a detected object into one of a plurality of predetermined object classes based on at least one motion parameter of the object.

With returned reference to FIG. 1, the process 100 of automated detection and classification may include classifying 150 an object into one of a predetermined plurality of object classes. In this regard, once at least one motion parameter is determined based on the association of an object to a motion track, the at least one motion parameter may be used in a classification process to classify an object. The classification may be based on a machine learning process where training data may be used to train a machine learning process used to carry out the classification. For instance, FIG. 11 depicts a method 1100 for such classifying 150. The method 1100 may be executed by the classification module 218. The method 1100 may include capturing 1102 training data. That is, sequential frames of image data with known objects may be captured. The known objects may be by way of manually identification of the objects or preparation of receptacles with a known content of particles or the like. In any regard, the training data may undergo image processing and motion analysis as described above to generate features (e.g., at least including a motion parameter) related to the known objects. The method 1100 may also include defining 1104 predetermined object classes. The predetermined object classes may correspond to the known objects used in the training data. For instance, the predetermined object classes may at least include a class corresponding to particles that are undesirable in a receptacle such as a flexible container used to contain a product to be infused into a patient. In an embodiment, a plurality of classes of particles may be defined to distinguish between different kinds of particles (e.g., plastic shards, filaments, precipitate, or other known kinds of particles). Furthermore, in an embodiment, at least some of the classes may correspond to non-particles. For example, one or more classes may be defined for objects that are not particles (e.g., bubbles). In a specific embodiment, three classes may be defined. A first class may correspond to big bubbles, a second class may correspond to small bubbles, and a third class may correspond to particles.

In any regard, the method 1100 may include generation 1106 of a classification model (e.g., based on the training data). A number of different classification models may be utilized without limitation including, for example, an AdaBoost approach for adaptive boosting of weak classifiers, a decision tree approach, a k nearest neighbor approach, a support vector machine approach, or other appropriate classifier known in the art. For instance, any of the foregoing classifiers may be executed with respect to the training data in relation to objects with known classifications. Features of the training data may be analyzed by the classifiers to generate 1106 the classification model.

In turn, the method 1100 may include generation of feature data 1108 from receptacles to be identified (e.g., using the foregoing approaches for object detection and motion analysis). The features generate 1108 may include any or all of the foregoing features discussed including morphological features and/or motion parameters. As such, the features that are generated 1108 may include, for example, deviation of object size (after preprocessing), mean object size (after preprocessing), average object vertical motion direction, average object vertical acceleration, average object vertical motion variance, average object horizontal motion direction, average object horizontal acceleration, average object horizontal motion variance, average object total motion, average object total motion acceleration, average object total motion variance, object horizontal location, object vertical location, motion track length for the object, average object intensity, object length, object width, ratio of object length/width, real size of the object, red color value, green color value, or blue color value. In this regard, while features other than motion parameters may be considered, the classification may at least include consideration of a motion parameter of an object as determined from a motion track.

In the method 1100, classification may be performed in at least a two step classification. In this regard, all identified objects from a sequence of frames of image data may be first classified 1110 using a classifier into one of a big bubble category 1114 or all other classes. That is, an object from the sequence of frames of image data is classified in a predetermined object class corresponding to big bubbles 1114. All other object may undergo second classification 1112 where each object is classified into either a predetermined object class corresponding to small bubbles 1116 or a predetermined object class corresponding to particles 1118.

In this regard, one objective of the classification 1100 may be to distinguish between particles and bubbles. As described above, in the context of receptacle production, detection of bubbles may not be significant, while particle detection may be. For instance, detection of an object that is classified as a particle may be used to flag a receptacle for further manual inspection or may be used to reject the receptacle from production (e.g., resulting in the receptacle being discarded). To this end, some classification approaches were found to result in misclassification of bubbles. For instance, such instances were usually associated with larger bubbles stationary against the sidewall of the receptacle that rather than smaller, free floating bubbles. For instance, the larger bubbles were often found to move very slowly upwards along the wall of the flexible container being analyzed. As such, the use of the two stage classification as described in FIG. 11 may allow for further distinction between different classes of bubbles such that objects may be classified into one of at least three categories where at least two of the predetermined categories correspond to different bubble characteristics.

Furthermore, while a variety of features of an object (e.g., morphological features and motion parameter features) may be determined during object detection and motion analysis, it was found that many of the features identified were weak classifiers that were not discriminative between predetermined classes. A measure of the feature quality may be a class separability criterion. For instance, three different types of separability criterions may be provided. A first of which is a KullbackLeibler Divergence approach. Using this approach, the difference between the probability distributions of two classes is known as Kullback-Leibler divergence and may be calculated as:

$$J_{KL} = \int_{-\infty}^{\infty} (p(x|w_1) - p(x|w_2)) \ln\left(\frac{p(x|w_1)}{p(x|w_2)}\right) dx \quad \text{Equation 12}$$

where the values $w_1$ and $w_2$ are the two classes.

Another approach is the Bhattacharyya Divergence approach. In this approach, the Bhattacharyya distance between two classes $w_1$ and $w_2$ is derived from the minimum achievable classification error $P_e$, which may be defined as:

$$P_e \leq \sqrt{P(w_1)P(w_2)} \int_{-\infty}^{\infty} \sqrt{p(x|w_1)(p(x|w_2)} dx \quad \text{Equation 13}$$

By using Gaussian distributed probability density functions in Equation 13 and using the equality $P(w_1)=P(w_2)=0.5$, the following equation for the calculation of the Bhattacharyya divergence may be:

$$J_B = \frac{1}{4}(\mu_1 - \mu_2)^2 \left(\frac{1}{\sigma_1 + \sigma_2}\right) + \frac{1}{2}\ln\left(\frac{\sigma_1 + \sigma_1}{\sqrt{\sigma_1 + \sigma_2}}\frac{1}{2}\right) \quad \text{Equation 14}$$

where $\mu_1$ and $\mu_2$ are the means and $\sigma_1$ and $\sigma_2$ are the variances of the classes $w_1$ and $w_2$.

A third approach to calculation of a separability criterion is use of the Fisher criterion. The Fisher criterion is a distance based separability criteria. It may be a measure for the ratio between the covariance within the classes and the covariance between the classes. One way of calculation of the Fisher criterion is using the equation:

$$J_f = \text{Trace}\{S_w^{-1} S_B\}$$

Accordingly, by use of one or more of the separability criterion discussed above, the relative merit of the different features identified may be determined. Accordingly, for each step of classification 1110 and 1112 shown in FIG. 11, it may be appreciated that different ones of the features may be more useful in the classification than others based on the separability criterions calculated related to each classification. For instance, a number of features were identified to be particularly useful including, for example, mean object size, average object vertical motion variance, average object horizontal motion variance, average object total motion variance, object vertical location, and object real size.

Furthermore, by choosing the right classifier, the performance can be significantly improved during classification. For instance, as described above, in an embodiment four different classifiers including an AdaBoost classifier, a decision tree classifier, a k nearest neighbor classifier, and a support vector machine (SVM) may be used. However, any appropriate classifier or combination of classifiers may be used without limitation. AdaBoost, or "adaptive boosting" may be a classifier which is specialized in using weak features. With AdaBoost a strong classifier may be generated by combining many weak classifiers (e.g., in a cascaded application of weak classifiers). For this approach, each feature used to classify the object may be treated as a separate classifier. The decision tree approach may classify objects in a multistage decision process. While most of the other classifiers use the complete set of features jointly to make a decision, the decision tree may uses features sequentially to divide the sample set (e.g., objects to be classified or training data sets) into subsets until all (or most) samples of a subset belong to the same class. The k nearest neighbor approach may be described as a "lazy learner" given that all the computation is done during the classification. In this regard, to classify an object the nearest neighbors of the object are determined in the feature space. Then a class is decided according to the majority of the k nearest neighbors to an object. A small value for k increases the noise sensitivity, whereas a large value for k leads to less distinctive boundaries between the classes. The SVM may find a hyperplane in the feature space that separates the two classes and maximizes the margins between the two classes.

Furthermore, the classification may use feature subset selection and/or branch and bound searching. For instance, it may be advantageous to find a subset of features from the total number of features (e.g., less than all 22 features described above) that gives a minimal classification error with a classifier. It may be appreciated that an exhaustive search would take too long as the number of the possible subsets may be quite large (e.g., especially in the case of 22 features). Accordingly, a first step to scale down the search may include defining features that should always be included and defining features that should never be included. The definition of features that are always to be included in the classification and those never to be included may be determined based on the results of the separability criterion discussed above.

In turn, the degree of freedom for classification may be reduced (e.g., to a first classification 1110 between big bubbles versus others as described above) using a first set of a limited number of features. In turn, for the second classification 1112 related to classification of particles versus small bubbles, a second subset of a limited number of features may be chosen. In turn, a tree for all the possible combinations of the residual features may be created. As such, a branch and bound algorithm applicable to the first classification may be used to find the optimal subset of features to be used. The branch and bound algorithm may search the best set of features in the "forward mode," where the algorithm initially begins with a single feature and sequentially adds features. This algorithm may find the best solution under the condition that the error rate monotonously decreases by adding more features to the feature set used to classify an object. If this condition is not true for a feature set, in order to get as close as possible to the optimal solution, the same algorithm may also be executed in a "backward mode." In the backward mode, all features are included and thereafter removed sequentially, until a local maximum is determined. In this regard, the features used for classification 1110 and 1112 may be reduced such that the processing cost for each classification may be reduced, thus speeding the classification for a more efficient system.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A method for automated detection and classification of objects in a receptacle containing a fluid utilizing a machine vision system, comprising:
    detecting, using a processor of the machine vision system, a first object in the fluid contained by the receptacle that appears in a plurality of sequential frames of digital image data of the receptacle;
    determining, using a processor of the machine vision system, at least one motion parameter corresponding to movement of the first object through the fluid in the plurality of sequential frames; and
    classifying, using a processor of the machine vision system, the first object into one of a predetermined plurality of object classes at least partially based on the at least one motion parameter of the first object.

2. The method according to claim 1, further comprising:
    moving the receptacle to initiate movement of the first object through the fluid in the receptacle; and
    after moving the receptacle, capturing the plurality of sequential frames of digital image data of the receptacle with a camera of the machine vision system with the receptacle stationary relative to the camera.

3. The method according to claim 2, wherein moving the receptacle comprises:
    displacing the receptacle at least with respect to an axis orthogonally disposed relative to a field of view of the camera and the force of gravity.

4. The method according to claim 1, wherein detecting the first object comprises:
    observing pixels in at least a portion of the plurality of sequential frames of digital image data;
    generating a background image corresponding to the receptacle based on the observing step; and
    subtracting the background image from each of the plurality of sequential frames of digital image data to generate a foreground image indicative of the first object.

5. The method of claim 4, further comprising:
    establishing a relative weighting for a first pixel of the foreground image relative to at least one other pixel value of the foreground image based on corresponding relative pixel intensities for the background image.

6. The method according to claim 5, wherein the relative weighting is inversely proportional to the relative intensities of the corresponding pixels for the background image.

7. The method according to claim 1, further comprising:
    associating the first object with a first motion track.

8. The method according to claim 7, further comprising:
    calculating the at least one motion parameter for the first object at least partially based on the first motion track to which the first object is associated.

9. The method according to claim 8, wherein the first motion track is determined using observations of a location of the first object in the fluid of the receptacle in respective previous ones of the plurality of sequential frames of digital image data of the receptacle.

10. The method according to claim 9, further comprising:
    establishing, at least partially based on the first motion track, a predicted area comprising a subset of pixels of a frame of the plurality of sequential frames of digital image data within which the first object is expected to be located in the frame.

11. The method according to claim 10, wherein a plurality of objects are located in the predicted area, and wherein associating the first object comprises:
    performing a statistical analysis for each of the plurality of objects relative to the first motion track to determine which of the plurality of objects corresponds to the first object.

12. The method according to claim 11, wherein the statistical analysis comprises at least one of a global nearest neighbor (GNN) approach and a joint probabilistic data association (JPDA) approach.

13. The method according to claim 8, further comprising:
    detecting, using a processor of the machine vision system, at least a second object in the fluid contained by the receptacle that appears in a plurality of sequential frames of digital image data of the receptacle;
    associating the second object with a second motion track;
    calculating at least one motion parameter corresponding to movement of the second object through the fluid in the plurality of sequential frames at least partially based on the second motion track to which the second object is associated;
    classifying, using a processor of the machine vision system, the second object into one of a predetermined plurality of object classes at least partially based on the at least one motion parameter of the second object.

14. The method according to claim 8, further comprising:
    establishing the first motion track in response to detecting the first object.

15. The method according to claim 14, wherein the first motion track is established only if an intensity value of one or more pixels corresponding to the first object is greater than a minimum new track threshold value.

16. The method according to claim 1, wherein the motion parameter comprises at least one of a velocity, a direction of travel, or an acceleration of the first object.

17. The method according to claim 1, wherein classifying the first object comprises:
    executing a classification model using the processor of the machine vision system at least partially based on one or more features at least including the at least one motion parameter.

18. The method according to claim 17, wherein the classification model is generated using training data corresponding to one or more observed features of training objects to establish the predetermined plurality of object classes.

19. The method according to claim 17, wherein the one or more features comprise a plurality of features that are selected from the group consisting of a motion parameter, a morphological characteristic, a radiometric characteristic, or a combination thereof.

20. The method according to claim 1, wherein a first predetermined object class corresponds to particles and a second predetermined object class corresponds to bubbles.

21. The method according to claim 1, wherein classifying the first object includes:
   first classifying the first object into a subset group of the predetermined plurality of object classes; and
   second classifying the first object into one of the subset group of the predetermined plurality of object classes.

22. The method according to claim 12, wherein the subset group of the predetermined plurality of object classes include a first predetermined object class corresponds to particles and a second predetermined object class corresponds to bubbles of a predetermined size.

23. The method according to claim 1, further comprising:
   generating an indication that the receptacle is defective upon classification of the first object into an object class corresponding to particles exceeding a predetermined size.

24. The method according to claim 23, wherein the indication comprises a human 1 perceivable indication.

25. The method according to claim 23, further comprising:
   discarding the receptacle in response to the indication.

26. The method according to claim 1, wherein each pixel in the plurality of sequential frames of digital image data corresponds to a resolution of not less than about 100 microns.

27. The method according to claim 1, wherein each pixel in the plurality of sequential frames of digital image data corresponds to a resolution of not less than about 60 microns.

28. A machine vision system for automated detection and classification of objects in a receptacle containing a fluid, comprising:
   a receptacle support member operable to supportably engage a receptacle containing a fluid in a receptacle support region;
   a camera having an imaging field encompassing the receptacle support region, the camera being operable to output a plurality of sequential frames of digital image data of the imaging field including the receptacle support region;
   an image processing module in operative communication with the camera for receiving the plurality of sequential frames of digital image data, wherein the imaging processing module includes a detection module to detect a first object in the fluid of the receptacle that appears in the plurality of sequential frames of digital image data of the receptacle, a motion analysis module to determine at least one motion parameter corresponding to movement of the first object through the fluid in the plurality of sequential frames of digital image data, and a classification module to classify the first object into one of a predetermined plurality of object classes at least partially based on the at least one motion parameter of the first object.

29. The machine vision system of claim 28, wherein the receptacle support member is moveable to initiate movement of the object in the fluid of the receptacle.

30. The machine vision system of claim 29, wherein the receptacle support member is moveable at least with respect to an axis orthogonally disposed relative to the force of gravity.

31. The machine vision system of claim 30, wherein the receptacle support member is moveable at least with respect to an axis orthogonally disposed to the direction of the imaging field of the camera.

32. The machine vision system of claim 31, wherein the receptacle support member is transparent between the receptacle support region and the camera.

33. The machine vision system of claim 32, wherein the receptacle support region is disposed between a light emitter and the camera.

34. The machine vision system of claim 29, wherein the fluid within the receptacle is transparent.

35. The machine vision system of claim 34, wherein the receptacle comprises a flexible bag.

36. The machine visions system of claim 35, wherein the flexible bag is at least partially transparent.

37. The machine vision system of claim 36, wherein the receptacle support member comprises opposing transparent sidewall members supportably engaged with the receptacle at least in the receptacle support region.

38. A machine vision system for automated detection and classification of objects in a receptacle containing a fluid, comprising:
   a receptacle support member operable to supportably engage a receptacle containing a fluid in a receptacle support region;
   a camera having an imaging field encompassing the receptacle support region, the camera being operable to output a plurality of sequential frames of digital image data of the imaging field including the receptacle support region;
   an image processing module in operative communication with the camera for receiving the plurality of sequential frames of digital image data, wherein the imaging processing module includes a detection module to detect a first object in the fluid of the receptacle that appears in the plurality of sequential frames of digital image data of the receptacle, a motion analysis module to determine at least one motion parameter corresponding to movement of the first object through the fluid in the plurality of sequential frames of digital image data, and a classification module to classify the first object into one of a predetermined plurality of object classes at least partially based on the at least one motion parameter of the first object, wherein the at least one motion parameter includes at least one of an average horizontal motion direction, an average vertical motion direction, an average motion variance, and a track length.

* * * * *